United States Patent
Tamura

(10) Patent No.: US 9,686,257 B2
(45) Date of Patent: Jun. 20, 2017

(54) AUTHORIZATION SERVER SYSTEM, CONTROL METHOD THEREOF, AND STORAGE MEDIUM

(71) Applicant: CANON KABUSHIKI KAISHA, Tokyo (JP)

(72) Inventor: Yu Tamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/037,714

(22) Filed: Sep. 26, 2013

(65) Prior Publication Data

US 2014/0090027 A1 Mar. 27, 2014

(30) Foreign Application Priority Data

Sep. 27, 2012 (JP) ................................. 2012-214267

(51) Int. Cl.
  *H04L 29/06* (2006.01)
  *G06F 21/41* (2013.01)
  *G06F 21/60* (2013.01)

(52) U.S. Cl.
  CPC .............. *H04L 63/08* (2013.01); *G06F 21/41* (2013.01); *G06F 21/608* (2013.01); *H04L 63/10* (2013.01); *H04L 63/20* (2013.01)

(58) Field of Classification Search
  CPC ......... H04L 63/10; H04L 63/08; H04L 63/20; G06F 21/41; G06F 21/608
  See application file for complete search history.

(56) References Cited

U.S. PATENT DOCUMENTS

| 8,533,796 | B1* | 9/2013 | Shenoy ............... H04L 63/0815 380/229 |
| 8,793,509 | B1 | 7/2014 | Nelson et al. |
| 8,800,009 | B1* | 8/2014 | Beda, III ............ H04L 63/0846 713/155 |
| 2005/0120211 | A1* | 6/2005 | Yokoyama .................... 713/168 |
| 2006/0077438 | A1 | 4/2006 | Lovat |
| 2008/0130042 | A1* | 6/2008 | Iizuka et al. ................. 358/1.15 |
| 2010/0281522 | A1* | 11/2010 | Hatakeyama ..................... 726/4 |

(Continued)

FOREIGN PATENT DOCUMENTS

| CN | 1763762 A | 4/2006 |
| CN | 101192135 A | 6/2008 |

(Continued)

OTHER PUBLICATIONS

Hardt, D., Ed., "The OAuth 2. 0 Authorization Framework", Chapter 1. Introduction, pp. 7-22, Oct. 2012, Internet Engineering Task Force (IETF) Proposed Standard.

(Continued)

*Primary Examiner* — Matthew Smithers
*Assistant Examiner* — Alexander Lapian
(74) *Attorney, Agent, or Firm* — Canon U.S.A., Inc. IP Division

(57) ABSTRACT

In response to reception of a request, an authorization server system identifies authorization based on first authorization information received by a reception unit along with the request. The authorization server system gives at least some of the identified authorization to an application, and issues second authorization information for identifying the given authorization.

11 Claims, 17 Drawing Sheets

(56) References Cited

U.S. PATENT DOCUMENTS

| | | | |
|---|---|---|---|
| 2011/0109427 A1* | 5/2011 | Mihira et al. ............... 340/5.8 |
| 2011/0321176 A1* | 12/2011 | Matsugashita ........ G06F 21/606 726/28 |
| 2012/0086980 A1 | 4/2012 | Numata |
| 2012/0102548 A1* | 4/2012 | Tamura ............................. 726/4 |
| 2012/0204233 A1* | 8/2012 | Rubio ............................... 726/4 |
| 2012/0210414 A1* | 8/2012 | Tamura ............................. 726/8 |
| 2013/0007846 A1* | 1/2013 | Murakami ............ H04W 12/08 726/4 |
| 2013/0054803 A1* | 2/2013 | Shepard ................. G06F 21/44 709/225 |
| 2013/0086639 A1* | 4/2013 | Sondhi et al. .................... 726/4 |
| 2013/0132232 A1* | 5/2013 | Pestoni .................. H04L 63/10 705/26.25 |
| 2014/0040993 A1* | 2/2014 | Lorenzo ................. G06F 21/41 726/4 |
| 2014/0282919 A1* | 9/2014 | Mason ................ H04L 63/0807 726/4 |
| 2015/0200948 A1* | 7/2015 | Cairns ..................... G06F 21/44 726/4 |

FOREIGN PATENT DOCUMENTS

| | | |
|---|---|---|
| EP | 1646179 A1 | 4/2006 |
| EP | 1928149 A2 | 6/2008 |
| EP | 2485459 A1 | 8/2012 |
| JP | 2012-008958 A | 1/2012 |

OTHER PUBLICATIONS

E. Hammer-Lahav, Ed., The OAuth 1.0 Protocol, Internet Engineering Task Force (IETF), Request for Comments: 6849, Category: Informational, ISSN: 2070-1721, Apr. 2010.

* cited by examiner

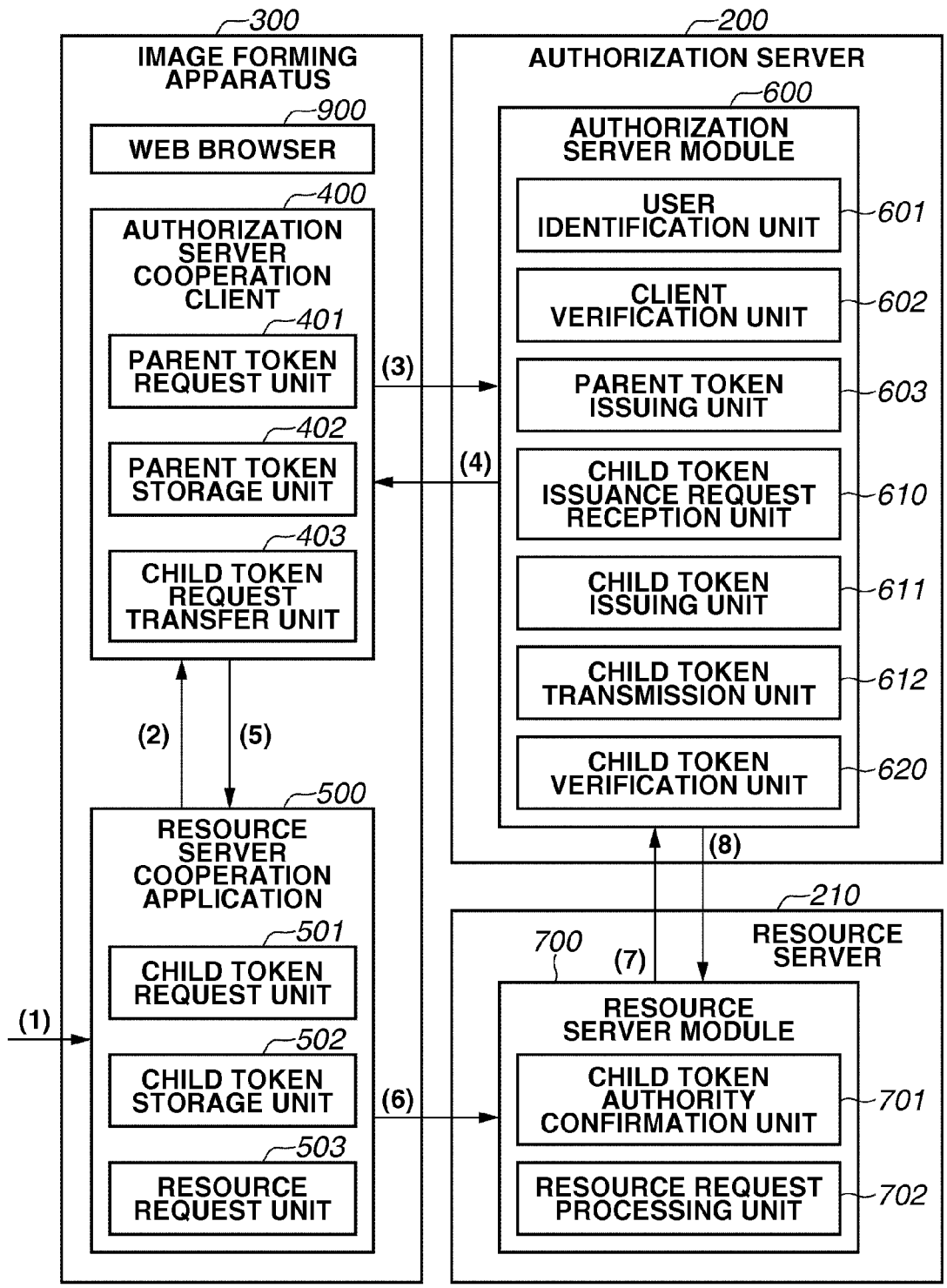

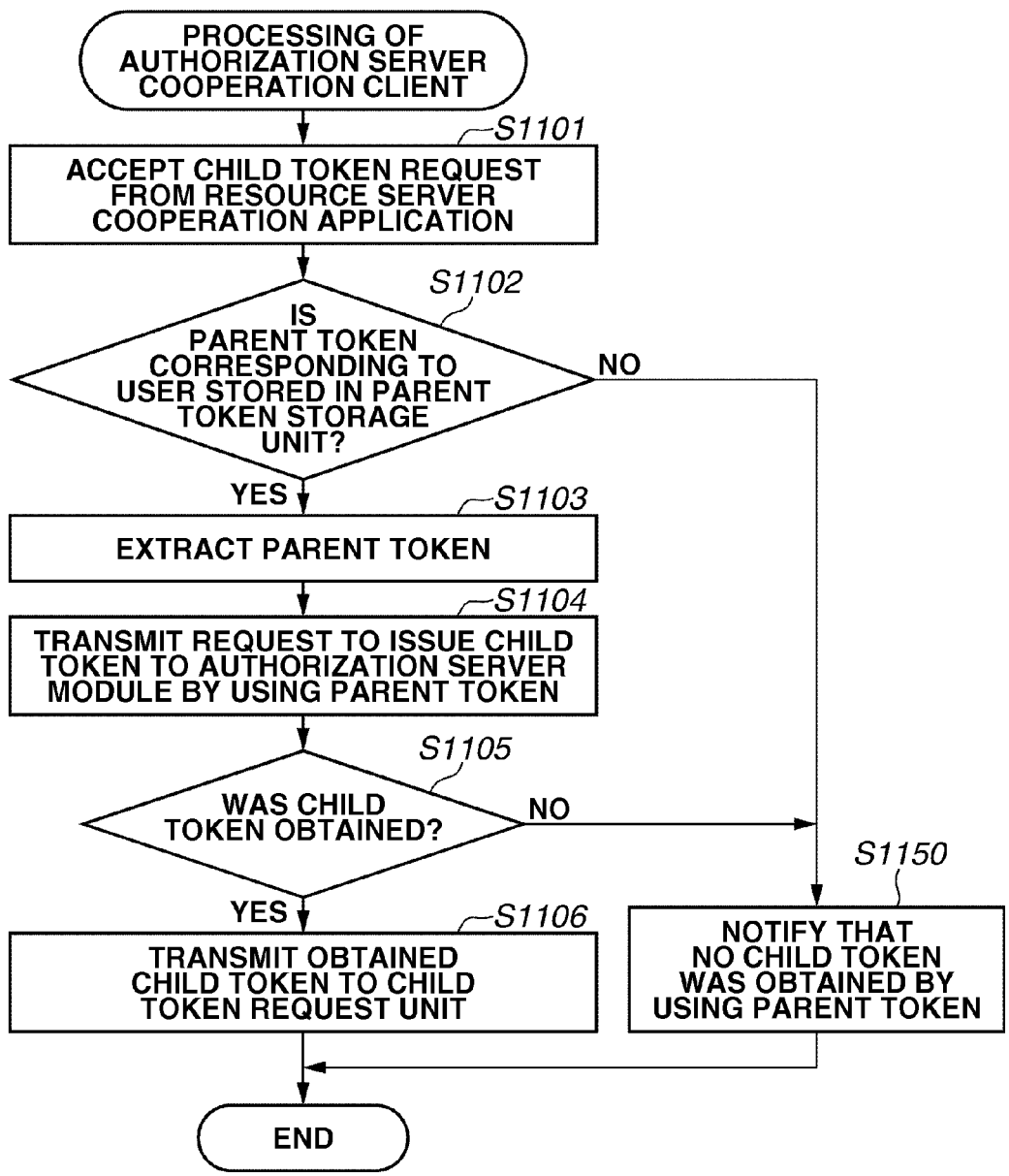

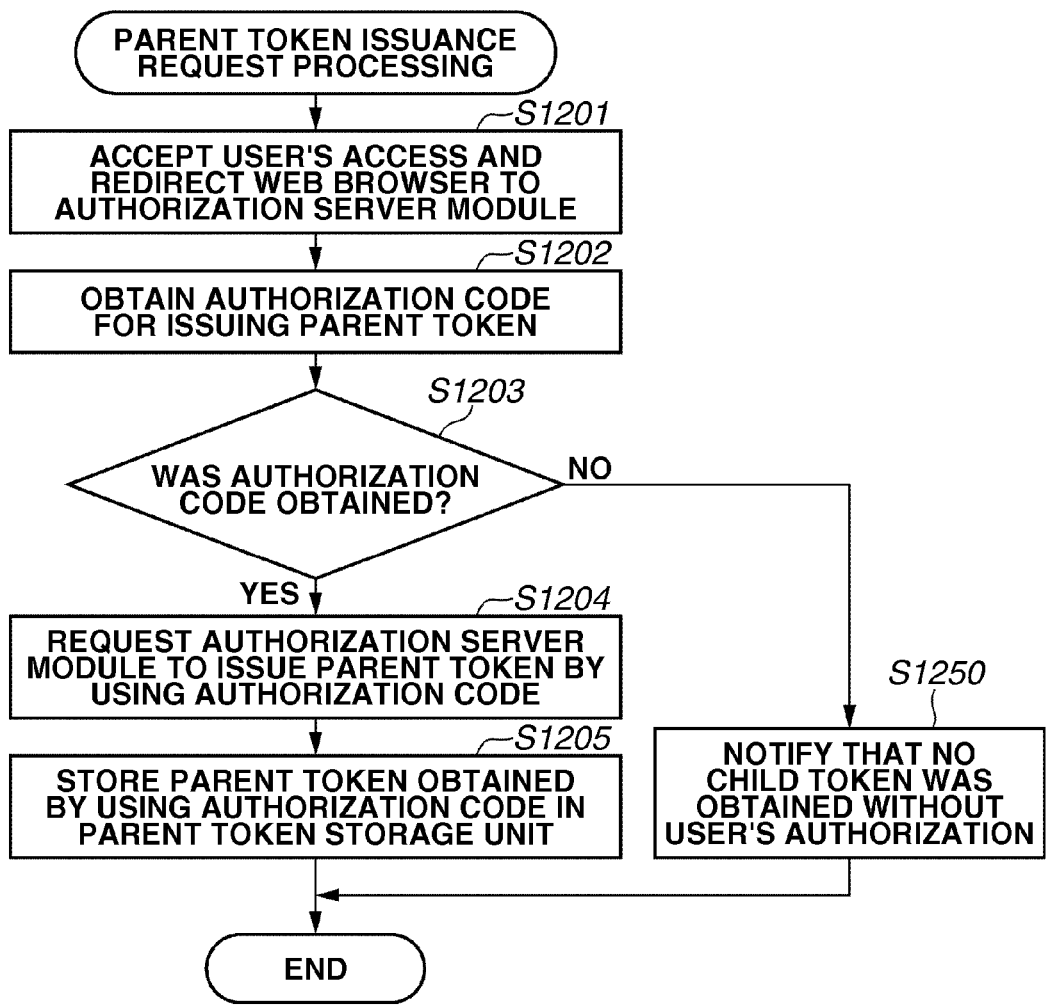

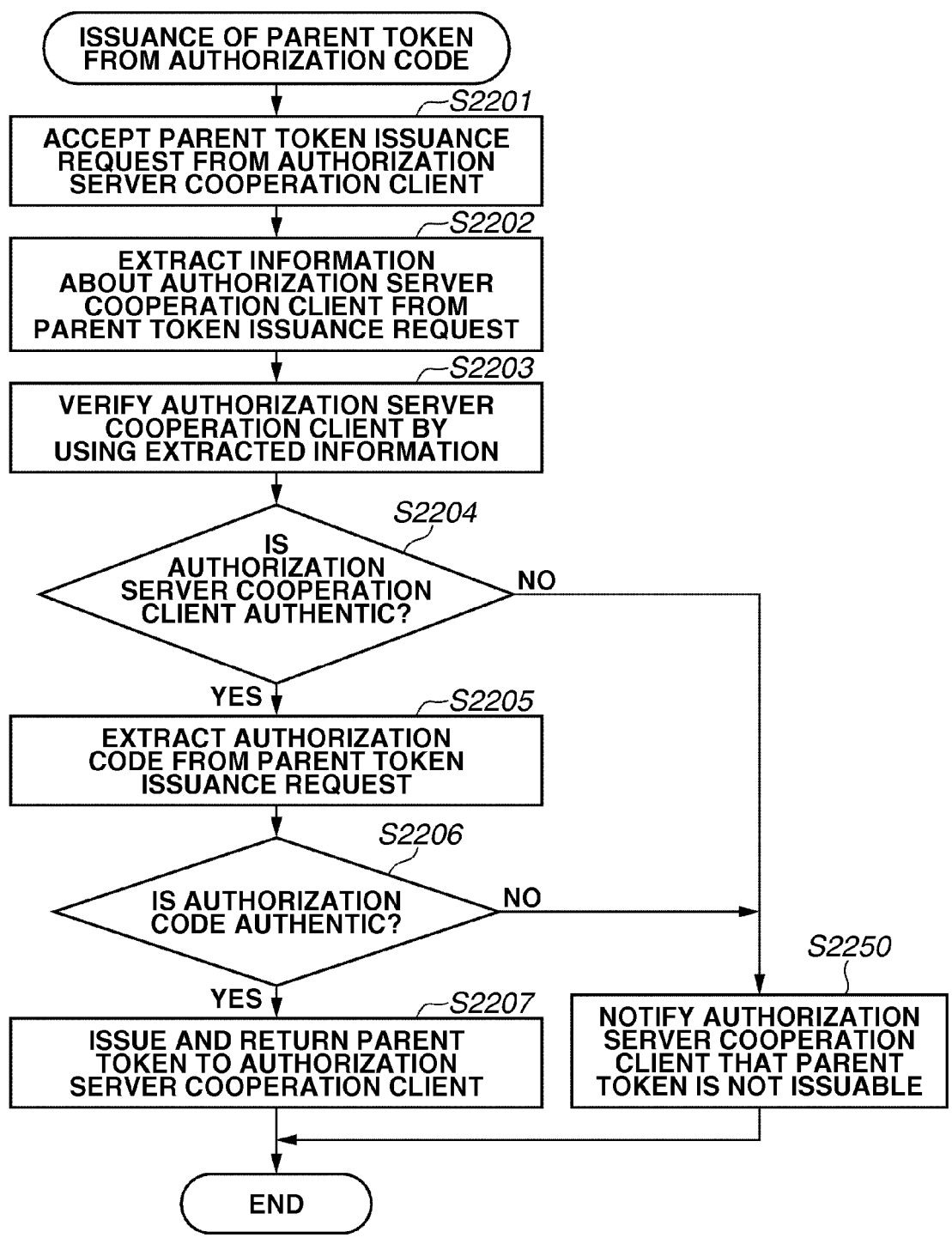

| USER ID | PARENT TOKEN |
|---|---|
| deviceUserA | parentToken11335577 |
| deviceUserB | parentTokenWWXXYYZZ |
| ⋮ | ⋮ |

| USER ID | CHILD TOKEN |
|---|---|
| deviceUserA | childToken12345678 |
| deviceUserB | childTokenABCDEFGH |
| ⋮ | ⋮ |

| URL | http://AuthorizationServer/endpoint/ |
|---|---|
| Client ID | clientABC |
| Client Secret | secretXXX |
| Scope | print, createForm |

| URL | http://AuthorizationServer/endpoint/ |
|---|---|
| Client ID | clientABC |
| Client Secret | secretXXX |
| Scope | wildcard |

| Client ID | AUTHORITY |
|---|---|
| clientABC | issueParentToken, print, createForm |
| clientDEF | issueParentToken, anyScope |
| clientGHI | anyScope |

| User ID | AUTHORITY |
|---|---|
| cloudUserX | print, createForm |
| cloudUserY | wildcard |

| PARENT TOKEN | Scope | User ID |
|---|---|---|
| parentToken11335577 | print, createForm | cloudUserX |
| parentTokenWWXXYYZZ | wildcard | cloudUserY |
| ⋮ | ⋮ | ⋮ |

| CHILD TOKEN | Scope | User ID |
|---|---|---|
| childToken12345678 | print | cloudUserX |
| childTokenABCDEFGH | createForm | cloudUserY |
| ⋮ | ⋮ | ⋮ |

INPUT INFORMATION ABOUT USER WHO DELEGATES AUTHORITY.

RESOURCE USER

PASSWORD

ACCESS PERMISSION TO YOUR DATA IS BEING REQUESTED.
CHECK DESCRIPTIONS AND CLICK ACCEPT OR REJECT BUTTON.

[DATA TO BE ACCESSED]
YOUR DATA IN REPOSITORY
[ACCESS SOURCE]
RESOURCE SERVER COOPERATION APPLICATION

ACCEPT    REJECT

AUTHORIZATION SERVER SYSTEM, CONTROL METHOD THEREOF, AND STORAGE MEDIUM

BACKGROUND OF THE INVENTION

Field of the Invention

The present invention relates to an authorization server system which performs authorization delegation, a control method thereof, and a storage medium.

Description of the Related Art

Servers that provide a service for generating electronic documents of Portable Document Format (PDF) format and a service for storing the electronic documents for terminals via the Internet have recently become prevalent. Users can use the services through their terminals to generate electronic documents even if the terminals do not have the function of generating an electronic document. The users can also store electronic documents more than the storage capacities of the terminals.

As cloud computing is attracting more and more attention, the opportunities to create new additional values through the cooperation of a plurality of services are ever increasing. Examples of possible forms of service cooperation include that an electronic document of PDF format generated by using a service is directly stored in another service without an intermediary of a terminal. Meanwhile, the cooperation of services can cause a problem.

The problem lies in that the risk of leakage of user data and personal information increases as information more than desired by the user is exchanged between services. It is undesirable for services other than those for providing a user-desired outcome to obtain user data and personal information during service cooperation. From the viewpoint of service providers, the mechanism of service cooperation is desirably easy to implement.

A standard protocol called OAuth (see Japanese Patent Application Laid-Open No. 2012-008958) has been developed for authorization cooperation. For example, suppose that OAuth is implemented in a plurality of services. If the user authorizes an external service B to access a service A by specific authorization, the external service B can access the service A without using authentication information about the user.

The service A is configured to provide the user with a clear description of the authorization such as the data to be accessed by the external service B and the range of services to be used. The service A then requests an explicit approval, i.e., authorization of the user about the access by the external service B. The user's action of explicitly giving authorization via an authorization screen will be referred to as an authorization operation.

If the user made an authorization operation, the service A gives specific authorization authorized by the user to the external service B. The external service B receives an authorization token directly or indirectly from the service A. The authorization token is a token that proves the approval of the access by the authorized authorization. The external service B subsequently can access the service A by using the authorization token.

The series of processes for storing the authorization token in the service-using subject, or the external service B in terms of the foregoing example, as a result of the user's authorization operation will be referred to as that the user delegates authorization to the external service B. As described above, it is the subject making the service available that delegates the actual authorization to the subject using the service. In terms of the foregoing example, the service A having confirmed that the user made an authorization operation gives the authorization.

This technique is used not only for the cooperation between the services, but is also known to be used in such a manner that an application of the terminal operated by the user cooperates with a service on the Internet by using OAuth.

For example, a plurality of applications can be installed in a smartphone capable of adding and removing applications. The applications may cooperate with a service or services on the Internet. Typical examples include that a service called social networking service (SNS) and the smartphone applications cooperate by using OAuth.

The applications installed in the smartphone access the SNS on behalf of the user. The user may delegate authorization to perform minimum functions needed to use the SNS, for example, authorization only to post an article to the applications. As a result, the applications can cooperate with the SNS by appropriate authorization without storing authentication information about the SNS in the smartphone.

SUMMARY OF THE INVENTION

The present invention is directed to an authorization server system.

According to an aspect of the present invention, an authorization server system capable of communicating with a server system configured to provide a service to an apparatus connected via a network and the apparatus including an application using the service includes a reception unit configured to receive a request to delegate authorization to use the service to the application, and receive first authorization information for identifying the authorization to use the service, an issuing unit configured to, in response to the reception of the request, identify the authorization based on the first authorization information received by the reception unit along with the request, give at least some of the identified authorization to the application, and issue second authorization information for identifying the given authorization, and a transmission unit configured to transmit the second authorization information issued by the issuing unit to a request source of the request.

Further features of the present invention will become apparent from the following description of exemplary embodiments with reference to the attached drawings.

BRIEF DESCRIPTION OF THE DRAWINGS

FIG. 3 is a module block diagram of each of the authorization server, the resource server, and the image forming apparatus according to the exemplary embodiment of the present invention.

FIGS. 4A, 4B, and 4C are flowcharts illustrating token an issuance request flow to be performed by the image forming apparatus according to the exemplary embodiment of the present invention.

FIGS. 5A, 5B, and 5C are flowcharts illustrating a parent token issuing flow to be performed by the authorization server according to the exemplary embodiment of the present invention.

FIGS. 8A and 8B illustrate token tables listing tokens obtained by the image forming apparatus according to the exemplary embodiment of the present invention.

FIGS. 9A and 9B illustrate authorization server cooperation information which an authorization server cooperation client according to the exemplary embodiment of the present invention has.

FIGS. 10A and 10B illustrate authorization tables which the authorization server according to the exemplary embodiment of the present invention has.

FIGS. 11A and 11B illustrate issued token tables which the authorization server according to the exemplary embodiment of the present invention has.

FIGS. 12A and 12B illustrate an authentication screen and an authorization screen according to the exemplary embodiment of the present invention.

DESCRIPTION OF THE EMBODIMENTS

Figure 1:
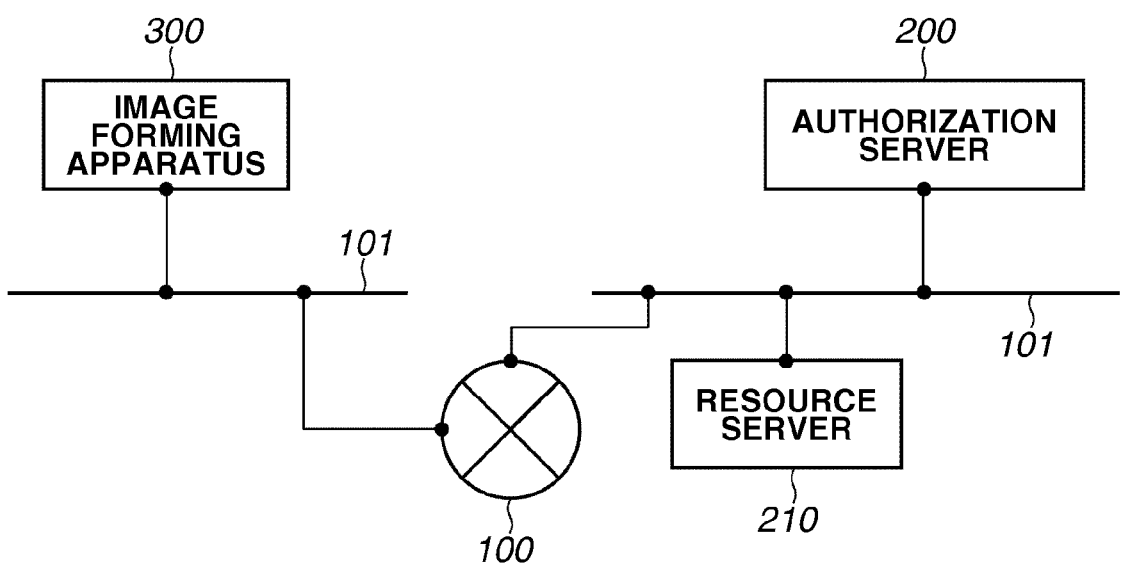
FIG. 1 is a diagram illustrating an authorization delegation system including an authorization server, a resource server, and an image forming apparatus.

Various exemplary embodiments, features, and aspects of the invention will be described in detail below with reference to the drawings.

Suppose that a user delegates authorization to applications on a terminal by using an authorization delegation protocol like OAuth. According to a conventional technique, the user inconveniently needs to perform an authorization operation on each application when the application is added to the terminal. A mechanism for delegating authorization to applications by a fewer number of authorization operations, for example, one authorization operation on the applications may thus be introduced to terminals and services in the future. Applications are generated for respective different purposes and cloud services to be used are different. The applications are therefore expected to need various types of authorization.

No mechanism for delegating authorization to applications without a user's authorization operation has been discussed. Excessive authorization can thus be delegated to the applications.

Suppose that excessive authorization is delegated to a malevolent application and the application accesses a resource server. In such a case, there is the risk of leakage or breakage of data stored in a cloud service. Even an application developed by a benevolent developer may contain a bug that makes an unexpected operation, in which case a similar risk to the foregoing arises.

An exemplary embodiment of the present invention solves the foregoing problem.

Initially, the exemplary embodiment of the present invention will be described in outline with a description of terms and phrases.

The exemplary embodiment of the present invention is predicated on that a form service for generating form data on the Internet and a printing service for obtaining and printing data on the Internet are installed in a server on the Internet. Functions provided from a network to an apparatus, like the form service and the printing service, will hereinafter be referred to as resource services.

In the exemplary embodiment of the present invention, the apparatus or terminal will be described by using an image forming apparatus as an example. A printing application and a form application installed on the image forming apparatus are assumed to use resource services. Applications using resource services, like the printing application and the form application, will hereinafter be referred to as resource service cooperation applications.

In the exemplary embodiment of the present invention, the mechanism of OAuth is used for authorization delegation processing. In OAuth, information for identifying the range of authorization delegated from a user is expressed by a data format called token. A subject making a service available, i.e., a server providing a resource service allows external access within the authorization identified based on a token. In the exemplary embodiment of the present invention, the information used to identify the range of authorization, including the token, will be referred to as authorization information. Information for defining the range of authorization to be delegated to a service-using subject, i.e., the image forming apparatus or the resource service cooperation application will be referred to as a scope. The token issued when the user delegates authorization to the image forming apparatus will be referred to as a parent token.

One of the key points of the exemplary embodiment of the present invention is that the user's authorization is delegated to the apparatus such as an image forming apparatus.

For example, suppose that there are a printing application and a form application on the image forming apparatus. According to a conventional technique, the user needs to perform individual authorization operations on the printing application and the form application when using a resource service from the printing application and when using a resource service from the form application, respectively.

From the viewpoint of the user who uses the resource services from the same image forming apparatus, the resource services are desirably made usable by the respective applications by one authorization operation. The image forming apparatus then delegates the authorization to the applications on behalf of the user, thereby reducing the number of authorization operations by the user. The user is considered to have implicitly authorized the delegation of the authorization to the applications when the user delegated the authorization to the image forming apparatus.

In the exemplary embodiment of the present invention, the user makes an authorization operation when delegating the authorization to the image forming apparatus. The user makes, however, no authorization operation when delegating the authorization to the applications. As described above, according to the exemplary embodiment of the present invention, the user's authorization is delegated to the apparatus to reduce the number of authorization operations by the user as compared to heretofore. This also enables the delegation of the authorization to an application or applications to be added in the future.

Now, a method for delegating the authorization to the applications will be described. One of possible methods or configurations for delegating the authorization to the applications is such that the applications share a parent token obtained by the image forming apparatus. However, if the applications share the parent token, exactly the same authorization is given to all the applications. Such a configuration is undesirable in terms of security. The reason why the configuration is undesirable in terms of security is the same as described above in the section of the problem of the present invention.

For example, the printing application needs printing authorization but not form generation authorization. The form application needs the form generation authorization but not the printing authorization. Since the applications are intended for respective different purposes, the applications need respective different types of authorization. In terms of security, each application is desirably given as minimum necessary authorization as possible.

In the exemplary embodiment of the present invention, the resource service cooperation applications are not allowed to directly use the parent token. One of the key points of the exemplary embodiment of the present invention is to issue a token having only limited authorization that is essentially needed by each resource service cooperation application within the authorization delegated to the image forming apparatus. Such a token will be referred to as a child token. The child token is issued when the image forming apparatus further delegates the authorization to the resource service cooperation application.

The present exemplary embodiment describes a concrete configuration for preventing the delegation of excessive authorization to the applications on the apparatus when delegating authorization between three parties including the user, the apparatus, and the applications on the apparatus.

The authorization delegation system according to the present exemplary embodiment is constructed on a network such as illustrated in FIG. 1. In the exemplary embodiment of the present invention, a wide area network (WAN) 100 constitutes a World Wide Web (WWW) system. Components are connected by local area networks (LANs) 101.

An authorization server 200 is intended to implement OAuth, and includes an authorization service module. A resource server 210 includes resource services such as a printing service and a form service.

One resource server may include one or a plurality of resource services. The authorization server 200 and the resource server 210 need not be a single server each but may be a server group including a plurality of servers.

An authorization server system refers to a server group including one or a plurality of servers including the authorization service module. Further, the authorization server system refers to a server group including neither the resource server 210 nor an image forming apparatus 300 to be described below.

The same applies to a resource server system. A resource server system refers to one or a plurality of servers including a resource service or services. If a server system includes a plurality of servers, the module (s) included in the server system may be divided and arranged in the plurality of servers. In such a case, a plurality of servers including some of the module(s) may cooperate to perform a function.

One or a plurality of resource service cooperation applications is installed in the image forming apparatus 300. The user uses a resource service or services by using the resource service cooperation application(s). The authorization server 200, the resource server 210, and the image forming apparatus 300 are connected via the WAN 100 and the LANs 101.

The authorization server 200, the resource server 210, and the image forming apparatus 300 may be constituted on respective individual LANs or on the same LAN. The authorization server 200 and the resource server 210 may be constituted on the same server.

Figure 2:
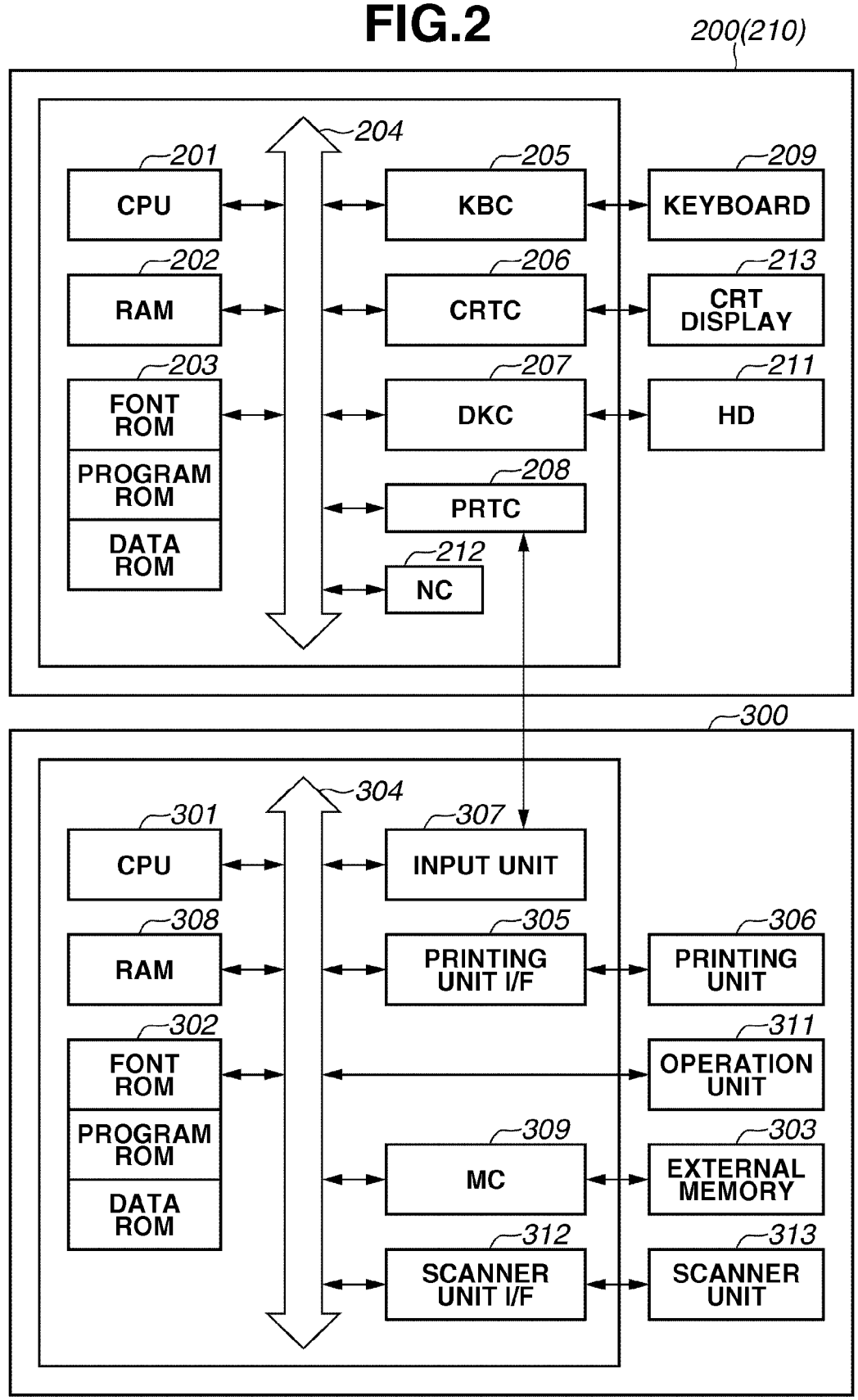
FIG. 2 is a hardware block diagram of the authorization server, the resource server, and the image forming apparatus according to an exemplary embodiment of the present invention.

The authorization delegation system according to the present exemplary embodiment is constructed on a system including the authorization server 200 or the resource server 210, and the image forming apparatus 300 having the hardware configuration illustrated in FIG. 2. FIG. 2 illustrates how the authorization server 200 or the resource server 210 is communicably connected with the image forming apparatus 300 via the network.

The configuration of the authorization server 200 will be described. FIG. 2 illustrates a hardware block diagram corresponding to that of a typical information processing apparatus. A hardware configuration of the typical information processing apparatus may be applied to the authorization server 200 of the present exemplary embodiment. The same holds for the resource server 210.

In FIG. 2, a central processing unit (CPU) 201 executes programs including an operating system (OS) and applications which are stored in a program read-only memory (ROM) of a ROM 203 or loaded from a hard disk (HD) 211 into a random access memory (RAM) 202. The OS refers to the one running on a computer. Processing of flowcharts to be described below can be implemented by the execution of the programs. The RAM 202 functions as a work area of the CPU 201.

A keyboard controller (KBC) 205 controls key inputs from a keyboard 209 and a not-illustrated pointing device. A cathode-ray tube controller (CRTC) 206 controls a display of a cathode-ray tube (CRT) display 213. A disk controller (DKC) 207 controls data access to the HD 211 and a Floppy™ disk (FD) which store various types of data. A printer controller (PRTC) 208 controls exchange of signals with the connected image forming apparatus 300. A network card (NC) 212 is connected to the network. The NC 212 performs communication control processing with the image forming apparatus 300 and other devices connected to the network.

In the following description, the subject that executes server operations in terms of hardware is the CPU 201 unless otherwise specified. In terms of software, the subject is an application program or programs installed in the HD 211.

The configuration of the image forming apparatus 300 will be described. A CPU 301 of the image forming apparatus 300 controls the blocks connected to a system bus 304 based on a control program stored in a ROM 302 or an external memory 303.

An image signal generated by the processing of the CPU 301 is output as output information to a printing unit (image forming apparatus engine) 306 via a printing unit interface (I/F) 305. The image forming apparatus 300 may include a scanner unit 313 for reading a document. The image forming apparatus 300 includes at least either one of image processing units including the printing unit 306 and the scanner unit 313. The CPU 301 can perform communication processing with the authorization server 200 via an input unit 307. The CPU 301 can notify internal information about the image forming apparatus 300 to the authorization server 200.

The ROM 302 includes a program ROM, a font ROM, and a data ROM. The program ROM stores the control program of the CPU 301. The font ROM stores font data which is used when generating the output information. The data ROM stores information to be used by the authorization server 200 if the image forming apparatus 300 includes no external memory 303 such as a hard disk.

A RAM 308 is a RAM that functions as a work area of the CPU 301. The RAM 308 is configured so that an optional RAM or RAMs can be connected to expansion ports (not illustrated) to expand the memory capacity. The RAM 308 is used as an output information loading area, an environment data storage area, and a nonvolatile RAM (NVRAM). A memory controller (MC) 309 controls access to the external memory 303.

The external memory 303 is optionally connected to store font data, an emulation program, and form data. An operation unit 311 includes a switch for accepting the user's operation, and a light-emitting diode (LED) indicator. In the following description, the subject that executes operations of the image forming apparatus 300 in terms of hardware is the CPU 301. In terms of software, the subject is an application program or programs installed in the external memory 303.

FIG. 3 is a diagram illustrating a configuration of modules included in the authorization server 200, the resource server 210, and the image forming apparatus 300.

The modules illustrated in FIG. 3 are all implemented by the CPUs of the apparatuses illustrated in FIG. 2 executing an application program or programs installed in the hard disk or external memory by using the RAMs.

The authorization server 200 includes an authorization server module 600. The authorization server module 600 includes a user identification unit 601, a client verification unit 602, a parent token issuing unit 603, a child token issuance request reception unit 610, a child token issuing unit 611, a child token transmission unit 612, and a child token verification unit 620. The resource server 210 includes a resource server module 700. The resource server module 700 includes a child token authorization confirmation unit 701 and a resource request processing unit 702.

The image forming apparatus 300 includes an authorization server cooperation client 400, a resource server cooperation application 500, and a web browser 900. As described above, a plurality of resource server cooperation applications 500 may be installed.

The image forming apparatus 300 may include the authorization server cooperation client 400, the resource server cooperation application 500, and the web browser 900 by default. The authorization server cooperation client 400, the resource server cooperation application 500, and the web browser 900 may be installed by the user afterward. The web browser 900 is an ordinary web browser which displays a screen provided by a server.

The authorization server cooperation client 400 includes a parent token request unit 401, a parent token storage unit 402, and a child token request transfer unit 403. The resource server cooperation application 500 includes a child toke request unit 501, a child token storage unit 502, and a resource request unit 503. As described above, a plurality of resource server cooperation modules 700 may be installed.

The system configuration, the hardware configuration, and the module configuration needed to carry out the exemplary embodiment of the present invention have been described above.

Now, how the modules illustrated in FIG. 3 cooperate to carry out the present exemplary embodiment will be described. Before describing the operations of the modules in detail, a key point of the present exemplary embodiment, namely, a series of processes by which the authorization server 200 issues a child token based on a parent token will be outlined with reference to FIG. 3.

Initially, in a process (1), the user instructs the resource server cooperation application 500 on the image forming apparatus 300 that the user needs to use a function of the resource server module 700. The resource server cooperation application 500 determines whether the resource server cooperation application 500 has a child token needed to use the resource server module 700. If the resource server cooperation application 500 has no such child token, then in a process (2), the resource server cooperation application 500 requests the child token from the authorization server cooperation client 400.

In a process (3), the authorization server cooperation client 400 requests the child token from the authorization server module 600 by using a parent token. In a process (4), in response to the request of the authorization server cooperation client 400, the authorization server module 600 issues a child token by using the received parent token. The authorization server module 600 returns the issued child token to the authorization server cooperation client 400. The process (4) in which the authorization server module 600 issues the child token by using the parent token is one of the key points of the present exemplary embodiment. A detailed description will be given below.

In a process (5), the authorization server cooperation client 400 returns the child token to the resource server cooperation application 500. In a process (6), the resource server cooperation application 500 issues a resource service use request to the resource server module 700 by using the child token.

In a process (7), the resource server module 700 requests the authorization server module 600 to verify the child token received from the resource server cooperation application 500. In a process (8), the resource server module 700 receives a verification result. If the resource server module 700 determines that the request can be processed by the authorization of the requesting resource server cooperation application 500, the resource server module 700 provides the service. The foregoing is the outline of the series of processes by which the authorization server 200 issues a child token based on a parent token.

The operations of the modules illustrated in FIG. 3 are described in detail below. Initially, processing by which the authorization server cooperation client 400 obtains a parent token from the authorization server module 600 will be described. The processing starts when the user accesses the authorization server cooperation client 400 by using the web browser 900.

For example, when the user installs the authorization server cooperation client 400 on the image forming apparatus 300, the image forming apparatus 300 may notify the user to access the authorization server cooperation client 400 by using the web browser 900 and to issue a parent token. Such a configuration can avoid the situation that the parent token storage unit 402 contains no parent token when the authorization server cooperation client 400 needs a parent token. Delegating the user's authorization to the authorization server cooperation client 400 is synonymous with delegating the authorization to the image forming apparatus 300.

In step S1201 of FIG. 4C, the parent token request unit 401 accepts access from the web browser 900 operated by the user. The parent token request unit 401 redirects the web browser 900 to the authorization server module 600. A uniform resource locator (URL) of the authorization server 200 for the web browser 900 to be redirected to and authentication information about the authorization server cooperation client 400 are managed as authorization server cooperation information 460 illustrated in FIG. 9A or authorization server cooperation information 461 illustrated in FIG. 9B.

FIGS. 9A and 9B further illustrate the scope of the parent token which the parent token request unit 401 requests from the authorization server module 600. FIG. 9A illustrates that the resource server cooperation applications include a printing application and a form application. The printing application and the form application need printing authorization and form generation authorization, respectively.

In such a case, the parent token request unit 401 may request a parent token that has both a "print" scope for delegating the printing authorization and a "createForm" scope for delegating the form generation authorization. As a result, the authorization server cooperation client 400 can issue a child token having the print scope and a child token having the createForm scope by using a single parent token.

To use an application that needs a third scope different from the print scope and the createForm scope, a new parent token having the third scope needs to be issued. Such a token will be referred to as a token for limiting the authorization to be given to an application.

FIG. 9B illustrates the authorization server cooperation information 461 when the parent token request unit 401 requests a parent token that allows the issuance of a child token having any scope.

The parent token that allows the issuance of the child token having any scope will be referred to as a wildcard parent token. The authorization server cooperation client 400 requests a "wildcard" scope as the scope of the wildcard parent token. The parent token having the wildcard scope can be used to eliminate the need to make the authorization server 200 reissue a parent token even if an application needing the third scope is added. The authorization server cooperation client 400 can issue a child token having any scope by using the wildcard parent token.

The wildcard parent token is suitable to an apparatus like the image forming apparatus 300 where new resource server cooperation applications can be added. The user need not perform an authorization operation for reissuing a parent token, which improves the convenience. A token having any scope like a wildcard parent token will be referred to as a token for not limiting the authorization to be given to an application.

Which token to issue depends not only on the scope (s) set by the authorization server cooperation client 400 but also on a scope (s) set by the user, which will be described in detail below.

In step S1202, the parent token request unit 401 obtains an authorization code for issuing a parent token. The flow for issuing the authorization code is described in detail below.

To authenticate the user, the authorization server module 600 makes the redirected web browser 900 display an authentication screen 800 as illustrated in FIG. 12A. The authorization server module 600 thereby makes the user input authentication information, and performs authentication based on the input authentication information. To request authorization from the authenticated user, the authorization server module 600 then makes the web browser 900 display an authorization screen 801 such as illustrated in FIG. 12B. The authorization server module 600 thereby makes the user perform an authorization operation. Note that FIG. 12B illustrates just an example of the authorization screen 801. The descriptions of the authorization to be displayed are not limited to those of data but may include a service name and/or a description of operation.

After the authentication and the authorization, the web browser 900 receives a request for redirection from the authorization server module 600 to the parent token request unit 401 and an authorization code indicating that an authorization operation has been performed. The parent token request unit 401 accepts the access of the web browser 900 redirected from the authorization server module 600. The parent token request unit 401 can obtain the authorization code from the web browser 900 at the time of the redirection.

In step S1203, the parent token request unit 401 determines whether the authorization code was obtained in step S1202. If the authorization code is determined to have been obtained (YES in step S1203), the parent token request unit 401 proceeds to step S1204. If no authorization code is determined to have been obtained (NO in step S1203), the parent token request unit 401 proceeds to step S1250. In step S1204, the parent token request unit 401 requests the authorization server module 600 to issue a parent token by using the authorization code obtained in step S1202.

In step S1205, the parent token request unit 401 stores the parent token obtained as a reply to step S1204 in the parent token storage unit 402. In step S1250, the authorization server cooperation client 400 notifies the child token request unit 501 of the resource server cooperation application 500 that no child token was obtained without the user's authorization. The authorization server cooperation client 400 ends the flow.

Figure 5A:
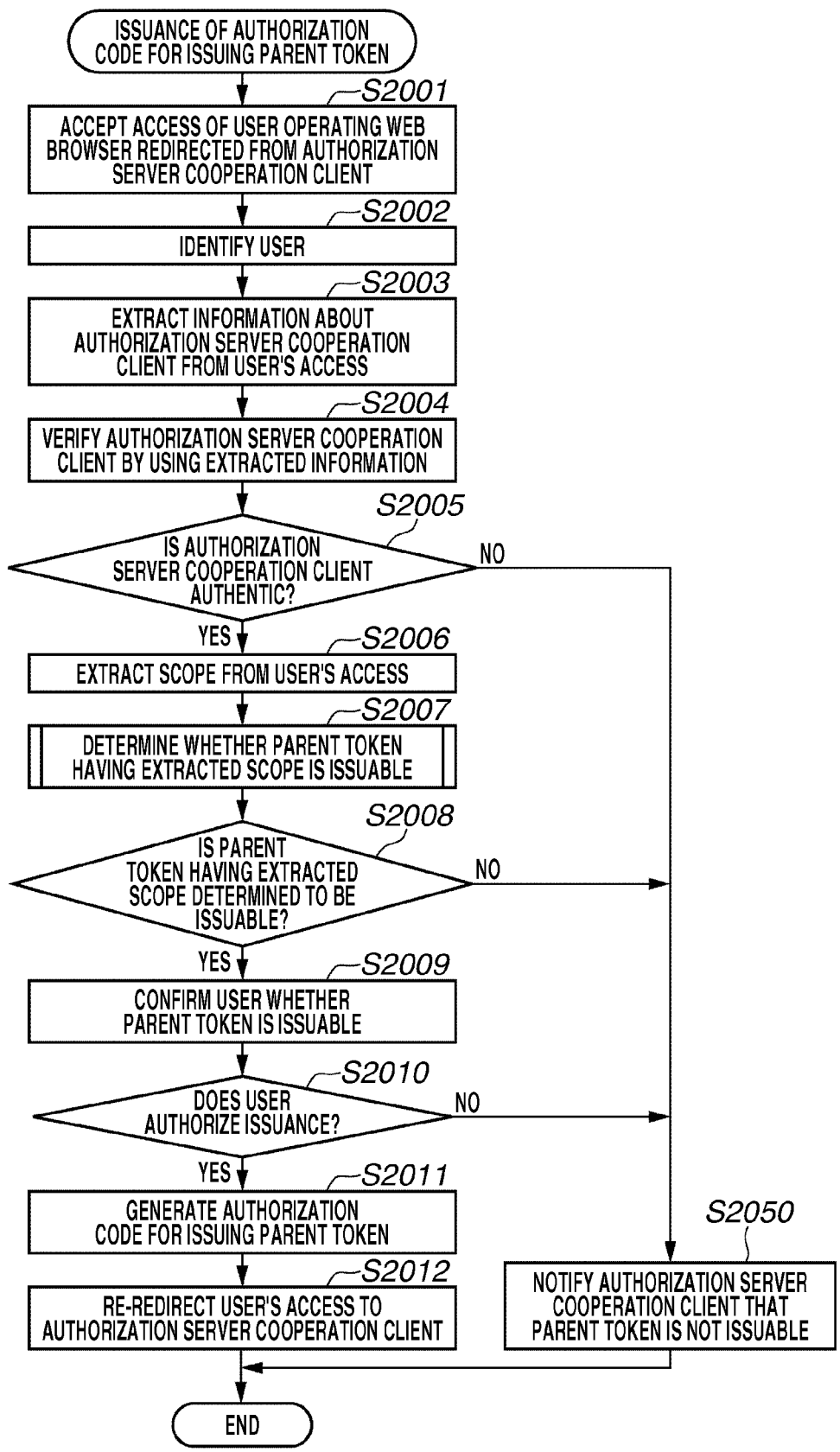

Processing by which the authorization server module 600 issues the authorization code for issuing the parent token is described with reference to FIG. 5A. This flow starts when the authorization server module 600 receives the access from the web browser 900 redirected in step S1201.

In step S2001, the authorization server module 600 accepts the access of the user operating the web browser 900 redirected from the authorization server cooperation client 400.

In step S2002, the user identification unit 601 identifies the user operating the web browser 900 redirected in step S2001. The user identification unit 601 identifies the user by using the user's authentication information input via the authentication screen 800 illustrated in FIG. 12A. If the identified user is an authentic user, the user identification unit 601 proceeds to step S2003. If the identified user is not an authentic user, the user identification unit 601 ends the flow (not illustrated).

In step S2003, the authorization server module 600 extracts information about the authorization server cooperation client 400 requesting the parent token from the user's access. In step S2004, the client verification unit 602 verifies the authorization server cooperation client 400 by using the information extracted in step S2003. In the present exemplary embodiment, the client verification unit 602 verifies the authorization server cooperation client 400 by using a client ID and a client secret illustrated in FIG. 9A or 9B.

In step S2005, the authorization server module 600 checks the result of verification in step S2004. According to the check result, if the authorization server cooperation client 400 requesting the parent token is determined to be authentic (YES in step S2005), the authorization server module 600 proceeds to step S2006. If the authorization server cooperation client 400 is determined not to be authentic (NO in step S2005), the authorization server module 600 proceeds to step S2050.

In step S2006, the parent token issuing unit 603 extracts the scope requested by the authorization server cooperation client 400 from the user's access accepted in step S2002.

In step S2007, the parent token issuing unit 603 determines whether a parent token having the scope extracted in step S2006 is issuable. The determination will be described in detail below.

In step S2008, according to the determination result of step S2007, if a parent token having the extracted scope is determined to be issuable (YES in step S2008), the parent token issuing unit 603 proceeds to step S2009. If the parent token is determined not to be issuable (NO in step S2008), the parent token issuing unit 603 proceeds to step S2050.

In step S2009, the parent token issuing unit 603 confirms the user whether the parent token is issuable to the authorization server cooperation client 400. The parent token issuing unit 603 can make the confirmation by displaying the authorization screen 801 as illustrated in FIG. 12B and by requesting an authorization operation from the user.

In the present exemplary embodiment, this authorization operation is the only authorization operation made by the user. When delegating the authorization to applications, the authorization server cooperation client 400 performs determination processing about the delegation of the authorization based on the parent token. It is not the user that subsequently delegates the authorization to the applications, but the authorization server cooperation client 400 included in the image forming apparatus 300 to which the user has delegated the authorization.

In step S2010, the parent token issuing unit 603 determines whether the user authorizes the issuance in step S2009. If the issuance is determined to be authorized (YES in step S2010), the parent token issuing unit 603 proceeds to step S2011. If the issuance is determined not to be authorized (NO in step S2010), the parent token issuing unit 603 proceeds to step S2050.

In step S2011, the parent token issuing unit 603 generates the authorization code for issuing the parent token. In step S2012, the parent token issuing unit 603 re-redirects the user's access via the web browser 900 accepted in step S2001 to the authorization server cooperation client 400, which is an access source. The re-redirected access of the user operating the web browser 900 includes the authorization code generated in step S2012. When the redirection is completed, the parent token issuing unit 603 ends the flow.

In step S2050, the authorization server module 600 re-redirects the user's access via the web browse 900 accepted in step S2001 to the authorization server cooperation client 400, which is the access source. When requesting the re-redirection, the authorization server module 600 issues a notification that the parent token is not issuable. When the redirection is completed, the authorization server module 600 ends the flow.

Figure 5B:
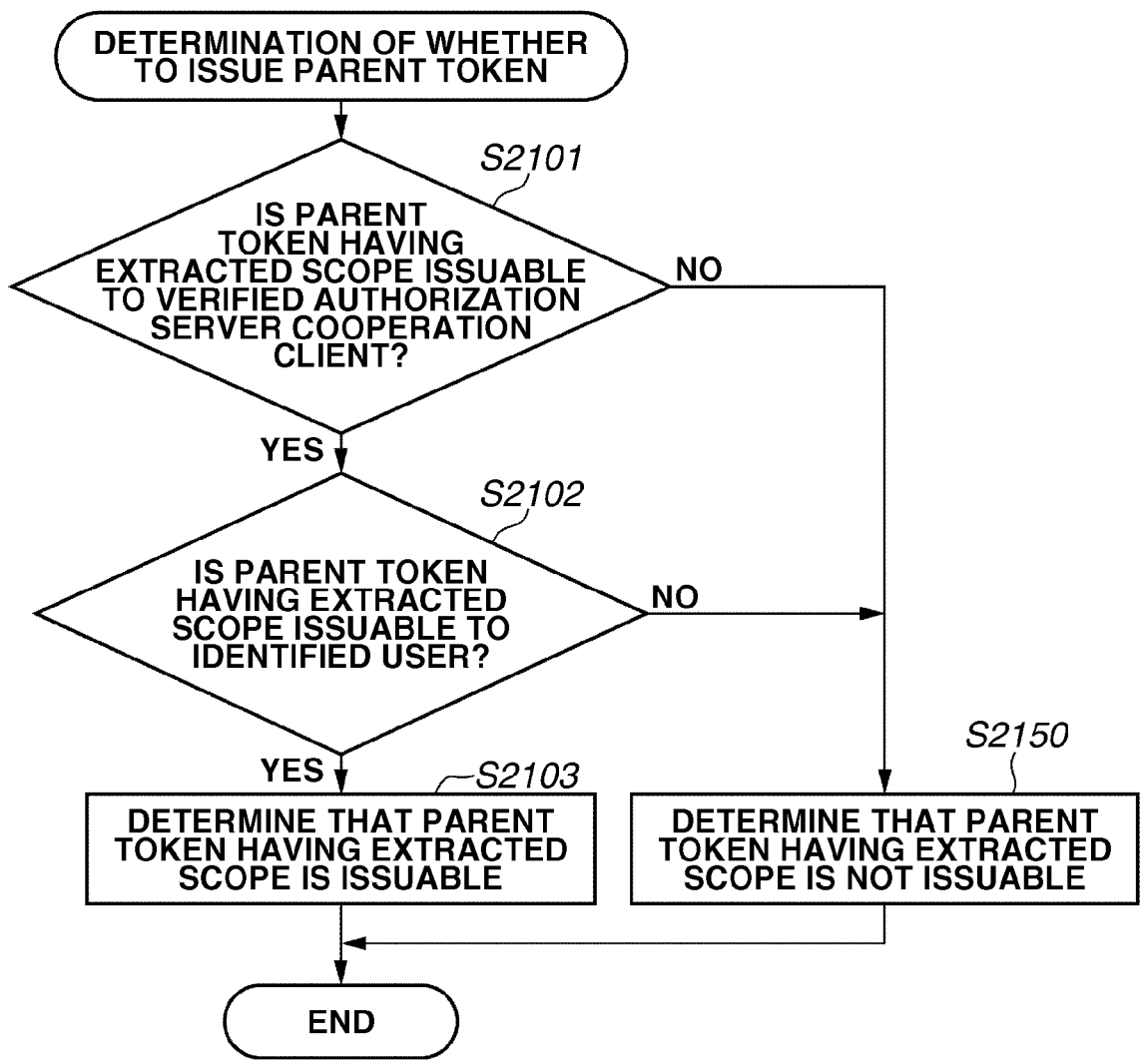

Then, processing for determining whether to issue a parent token by using the authorization code will be described with reference to FIG. 5B. This flow details step S2007 in FIG. 5A. In step S2101, the parent token issuing unit 603 determines whether to issue a parent token having the scope extracted in step S2006 to the authorization server cooperation client 400 verified in step S2004. If the parent token is determined to be issuable (YES in step S2101), the parent token issuing unit 603 proceeds to step S2102. If the parent token is determined not to be issuable (NO in step S2101), the parent token issuing unit 603 proceeds to step S2150. The parent token issuing unit 603 makes the determination by using a client authorization table 650 illustrated in FIG. 10A.

According to the client authorization table 650, client-ABC has "issueParentToken" authorization to issue a parent token. If the authorization server cooperation client 400 requesting the parent token has the client ID of clientABC, the parent token issuing unit 603 determines that a parent token is issuable.

On the other hand, clientGHI does not have the issueParentToken authorization to issue a parent token. If the authorization server cooperation client 400 requesting the parent token has the client ID of clientGHI, the parent token issuing unit 603 determines not to issue a parent token.

In step S2102, the parent token issuing unit 603 determines whether the parent token having the scope extracted in step S2006 is issuable to the user identified in step S2002. The parent token issuing unit 603 makes the determination by using a user authorization table 660 illustrated in FIG. 10B.

For example, suppose that the user identified in step S2002 is cloudUserX. According to the user authorization table 660, a parent token having the print scope and the createForm scope is issued to cloudUserX. If the requested parent token has either one or both of the print scope and the createForm scope, the parent token issuing unit 603 determines that the parent token is issuable.

For example, suppose that the user identified in step S2002 is cloudUserY. According to the user authorization table 660, cloudUserY is a user to whom a wildcard parent token is issuable. If the parent token issuing unit 603 is requested to issue a wildcard parent token, the parent token issuing unit 603 determines that the wildcard parent token is issuable.

In step S2103, in response to the determination results of steps S2101 and S2102, the parent token issuing unit 603 finally determines that the parent token having the scope extracted in step S2006 is issuable. The parent token issuing unit 603 ends the flow.

In step S2150, in response to the determination results of steps S2101 and S2102, the parent token issuing unit 603 finally determines that the parent token having the scope extracted in step S2006 is not issuable. The parent token issuing unit 603 ends the flow.

Processing by which the authorization server module 600 issues a parent token will be described with reference to FIG. 5C. This flow starts when the authorization server module 600 receives a parent token issuance request from the authorization server cooperation client 400 that has obtained the authorization code through step S2012.

In step S2201, the authorization server module 600 accepts a parent token issuance request from the authorization server cooperation client 400. In step S2202, the authorization server module 600 extracts information about the authorization server cooperation client 400 requesting the parent token from the parent token issuance request accepted in step S2201.

In step S2203, the client verification unit 602 verifies the authorization server cooperation client 400 by using the information extracted in step S2202. The client verification unit 602 performs the verification by using the client ID and the client secret illustrated in FIG. 9A.

In step S2204, the authorization server module 600 checks the result of verification in step S2203. According to the check result, if the authorization server cooperation client 400 requesting the parent token is determined to be authentic (YES in S2204), the authorization server module 600 proceeds to step S2205. If the authorization server cooperation client 400 is determined not to be authentic (NO in step S2204), the authorization server module 600 proceeds to step S2250.

In step S2205, the authorization server module 600 extracts the authorization code from the parent token issuance request accepted in step S2201.

In step S2206, the parent token issuing unit 603 determines whether the authorization code extracted in step S2205 is authentic. If the authorization code is determined to be authentic (YES in step S2206), the parent token issuing unit 603 proceeds to step S2207. If the authorization code is determined not to be authentic (NO in step S2206), the parent token issuing unit 603 proceeds to step S2250.

In step S2207, the parent token issuing unit 603 issues a parent token corresponding to the authorization code extracted in step S2205, and returns the issued parent token to the authorization server cooperation client 400 requesting the parent token. Having returned the parent token, the parent token issuing unit 603 ends the flow.

The parent token issued here is managed by using an issued parent token table 670 as illustrated in FIG. 11A. FIG. 11A illustrates the issued parent token table 670 after the issuance of two parent tokens; "parentToken11335577" and "parentTokenWWXXYYZZ". The parent tokens of parentToken11335577 and parentTokenWWXXYYZZ represent a parent token for identifying the print and createForm scopes and a wildcard parent token for identifying the wildcard scope, respectively. Suppose that the parent tokens are retained in the authorization server cooperation clients 400 of respective image forming apparatuses 300. In such a case, the authorization server 200 is considered to have given the authorization identified by the respective parent tokens to the image forming apparatuses 300.

For example, based on the parentToken11335577 parent token, the authorization server module 600 can identify that the user's print authorization and createForm authorization to use the printing service and the form service have been delegated to the authorization server cooperation client 400.

Based on the parentTokenWWXXYYZZ parent token, the authorization server module 600 can identify that the user's wildcard authorization to use all services provided by the resource server 210 has been delegated to the authorization server cooperation client 400.

In step S2250, the parent token issuing unit 603 notifies the authorization server cooperation client 400 requesting the parent token that the parent token is not issuable. The parent token issuing unit 603 ends the processing. Up to this point, the delegation of the user's authorization to the image forming apparatus 300 and the issuance of the parent token for identifying the delegated authorization have been described in detail.

Figure 4A:
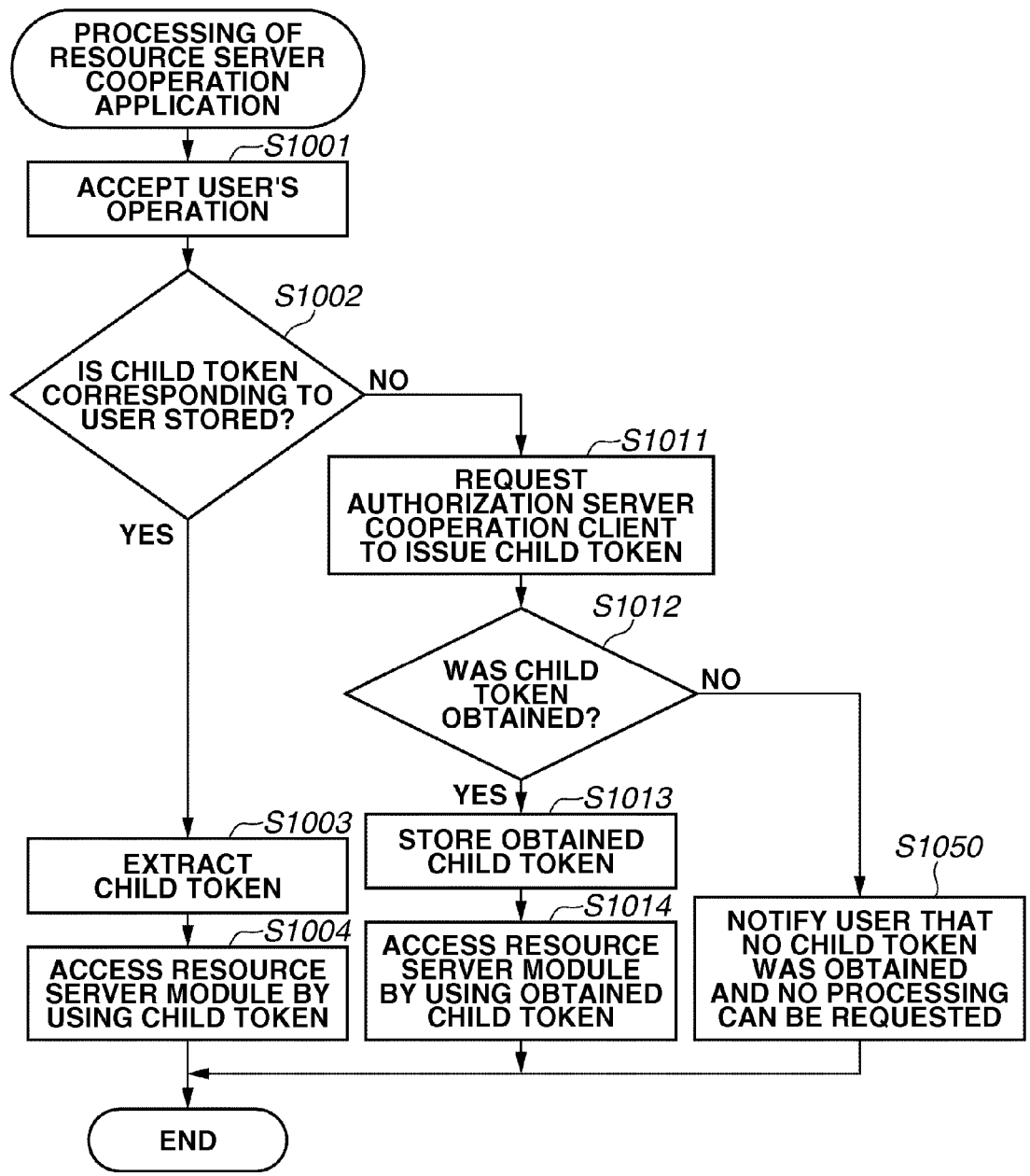

Now, the issuance of a child token after the issuance of the parent token will be described. The following flow details the flow of processes (1) to (10) in FIG. 3. FIG. 4A illustrates a flow of processing which the resource server cooperation application 500 on the image forming apparatus 300 according to the present exemplary embodiment performs according to the user's operation. This flow starts when the user operates the resource server cooperation application 500.

In step S1001, the resource server cooperation application 500 accepts the user's operation that needs a service provided by the resource server module 700.

In step S1002, the resource server cooperation application 500 checks the child token storage unit 502 to determine whether a child token corresponding to the operating user is stored.

FIG. 8B illustrates an obtained child token table 550 stored in the child token storage unit 502. If the user is deviceUserA or deviceUserB, the respective corresponding child token of "childToken12345678" or "childTokenABCDEFGH" is found. If the child token corresponding to the operating user is found (YES in step S1002), the resource server cooperation application 500 proceeds to step S1003. If no corresponding child token is found (NO in step S1002), the resource server cooperation application 500 proceeds to step S1011.

In step S1003, the resource request unit 503 extracts the child token found in step S1002 from the child token storage unit 502. In step S1004, the resource request unit 503 accesses the resource server module 700 on the resource server 210 by using the child token extracted in step S1003, and requests processing. The resource request unit 503 ends the flow of the resource server cooperation application 500.

In step S1011, the child token request unit 501 requests the authorization server cooperation client 400 to issue a child token. Here, the child token request unit 501 notifies the scope, which the resource server cooperation application 500 needs, to the authorization server cooperation client 400.

In the present exemplary embodiment, what authorization to be given to an application is determined based on the notification from the resource server cooperation application 500. The authorization server cooperation client 400 may determine whether the authorization can be given to the application based on the scope notified by the resource server cooperation application 500. In such a case, the authorization server cooperation client 400 needs to manage what authorization can be delegated application by application.

In step S1012, the child token request unit 501 determines whether a child token was obtained as a reply to the request of step S1011. If a child token is determined to have been obtained (YES in step S1012), the child token request unit 501 proceeds to step S1013. If no child token is determined to have been obtained (NO in step S1012), the child token request unit 501 proceeds to step S1050.

In step S1013, the child token request unit 501 stores the child token obtained as a reply to step S1011 in the child token storage unit 502. In step S1014, the resource request unit 503 accesses the resource server module 700 by using the child token obtained as a reply to step S1011, and requests processing. Completing the request of the processing, the resource request unit 503 ends the flow of the resource server cooperation application 500.

In step S1050, the resource server cooperation application 500 notifies the user that no child token was obtained as a reply to step S1011 and no processing can be requested of the resource server module 700. The resource server cooperation application 500 ends the flow.

Processing by which the authorization server cooperation client 400 returns a child token in response to a request of the resource server cooperation application 500 will be described with reference to FIG. 4B. This flow starts by the reception of a child token request from the resource server cooperation application 500. In step S1101, the authorization server cooperation client 400 receives a child token request from the resource server cooperation application 500.

In step S1102, the authorization server cooperation client 400 inquires the parent token storage unit 402 to check whether a parent token corresponding to the user operating the resource server cooperation application 500 is stored.

FIG. 8A illustrates an obtained parent token table 450 stored in the parent token storage unit 402. If the user is deviceUserA or deviceUserB, the respective corresponding parent token of "parentToken11335577" or "parentTokenWWXXYYZZ" is found. If the parent token corresponding to the user is found (YES in step S1102), the authorization server cooperation client 400 proceeds to step S1103. If no such parent token is found (NO in step S1102), the authorization server cooperation client 400 proceeds to step S1150.

In step S1150, the authorization server cooperation client 400 notifies the child token request unit 501 of the resource server cooperation application 500 that no child token was obtained by using the parent token. The authorization server cooperation client 400 ends the flow.

In step S1103, the authorization server cooperation client 400 extracts the parent token found in step S1102 from the parent token storage unit 402. In step S1104, the child token request transfer unit 403 transmits a request to issue a child token to the authorization server module 600 by using the parent token extracted in step S1103.

The child token request transfer unit 403 further transmits the scope notified by the child token request unit 501 of the resource server cooperation application 500 to the authorization server module 600. The URL of the authorization server 200 to access and the authentication information about the authorization server cooperation client 400 are managed as the authorization server cooperation information 460 illustrated in FIG. 9A or the authorization server cooperation information 461 illustrated in FIG. 9B.

In step S1105, the child token request transfer unit 403 determines whether a child token was obtained as a reply to step S1104. If a child token is determined to have been obtained (YES in step S1105), the child token request transfer unit 403 proceeds to step S1106. If no child token is determined to have been obtained (NO in step S1105), the child token request transfer unit 403 proceeds to step S1150.

In step S1106, the authorization server cooperation client 400 transmits the child token obtained as a reply to step S1104 to the child token request unit of the resource server cooperation application 500. The authorization server cooperation client 400 ends the flow.

As described above, the authorization server cooperation client 400 functions as a proxy that makes a child token issuance request on behalf of the resource server cooperation application 500. The image forming apparatus 300 including the authorization server cooperation client 400 performs authorization delegation on behalf of the user.

Figure 6A:
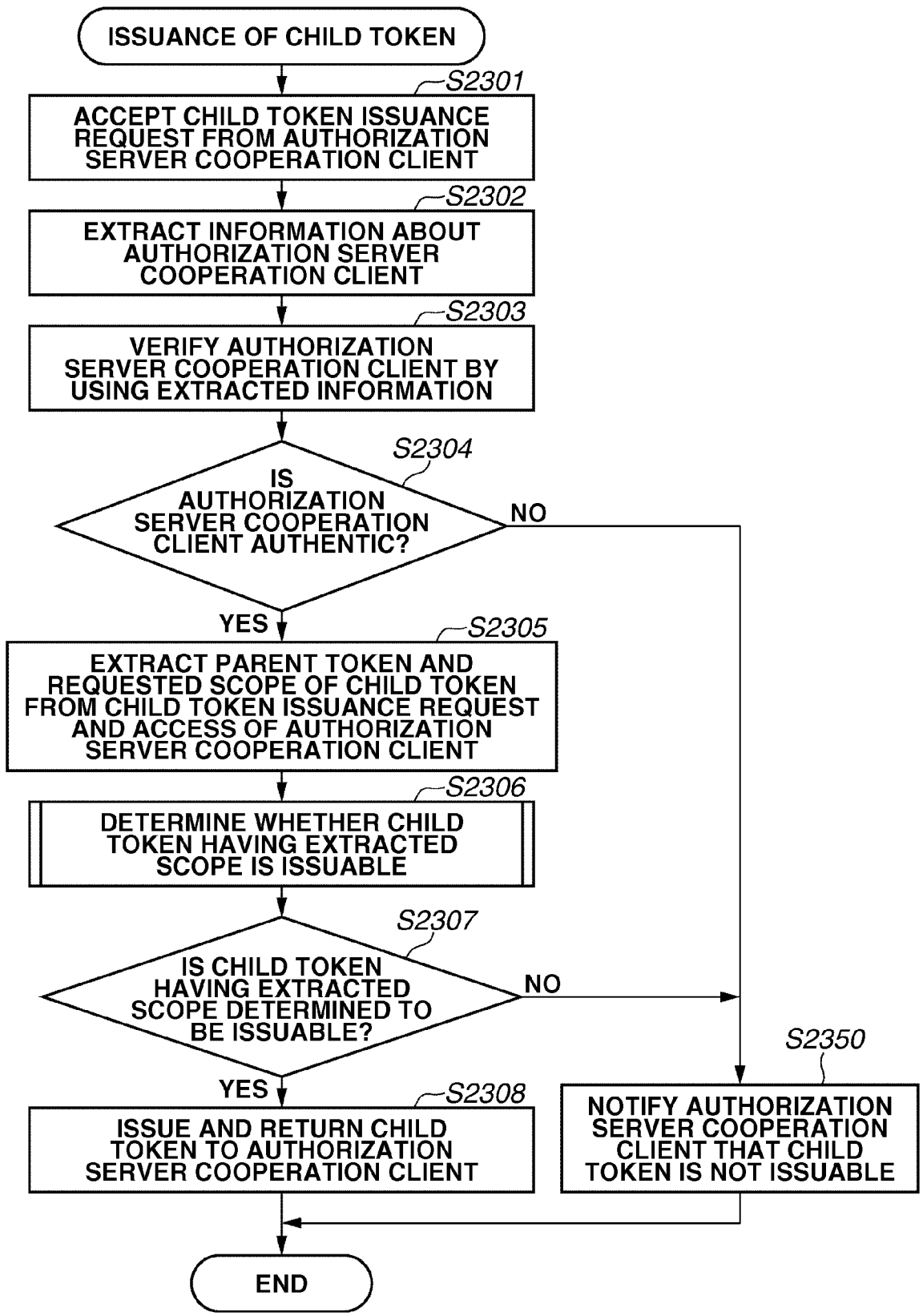
FIGS. 6A and 6B are flowcharts illustrating a child token issuing flow to be performed by the authorization server according to the exemplary embodiment of the present invention.

Processing by which the authorization server module 600 issues a child token will be described with reference to FIG. 6A. This flow starts when the authorization server module 600 accepts a child token issuance request from the authorization server cooperation client 400.

In step S2301, the child token issuance request reception unit 610 accepts a child token issuance request from the authorization server cooperation client 400. In step S2302, the child token issuance request reception unit 610 extracts information about the authorization server cooperation client 400 requesting the child token from the access of the authorization server cooperation client 400 along with the child token issuance request accepted in step S2301.

In step S2303, the client verification unit 602 verifies the authorization server cooperation client 400 by using the information extracted in step S2302. For example, the client verification unit 602 performs the verification by using the client ID and the client secret illustrated in FIG. 9A.

In step S2304, the child token issuance request reception unit 610 checks the result of verification in step S2303. According to the check result, if the authorization server cooperation client 400 requesting the child token is determined to be authentic (YES in step S2304), the child token issuance request reception unit 610 proceeds to step S2305. If the authorization server cooperation client 400 requesting the child token is determined not to be authentic (NO in step S2304), the child token issuance request reception unit 610 proceeds to step S2350.

In step S2305, the child token issuing unit 611 extracts the parent token and the scope of the child token requested by the authorization server cooperation client 400 from the access of the authorization server cooperation client 400 along with the child token issuance request accepted in step S2301. In step S2306, the child token issuing unit 611 determines whether the child token having the scope extracted in step S2305 is issuable. The determination will be described in detail below.

In step S2307, according to the determination result of step S2306, if the child token having the extracted scope is determined to be issuable (YES in step S2307), the child token issuing unit 611 proceeds to step S2308. If the child token is determined not to be issuable (NO in step S2307), the child token issuing unit 611 proceeds to step S2350.

In step S2308, the child token transmission unit 612 issues a child token as a reply to the child token issuance request accepted in step S2301, and returns the child token to the authorization server cooperation client 400 requesting the child token. Having returned the child token, the child token transmission unit 612 ends the flow.

The issued child token is managed by an issued child token table 680 as illustrated in FIG. 11B. FIG. 11B illustrates the issued child token table 680 after the issuance of two child tokens; "childToken12345678" and "childToken-ABCDEFGH". The illustrated child tokens represent ones to which the print scope and the createForm scope are given, respectively.

For example, based on the child token of childToken12345678, the authorization server module 600 can identify that the print authorization of the authorization server cooperation client 400 to use the printing service has been delegated to the resource server cooperation application 500. Based on the child token childTokenABCDEFGH, the authorization server module 600 can identify that the createForm authorization of another authorization server cooperation client 400 to use the form service has been delegated to another resource server cooperation application 500.

In step S2350, the child token issuance request reception unit 610 notifies the authorization server cooperation client 400 requesting the child token that the child token is not issuable. The child token issuance request reception unit 610 ends the flow.

Figure 6B:
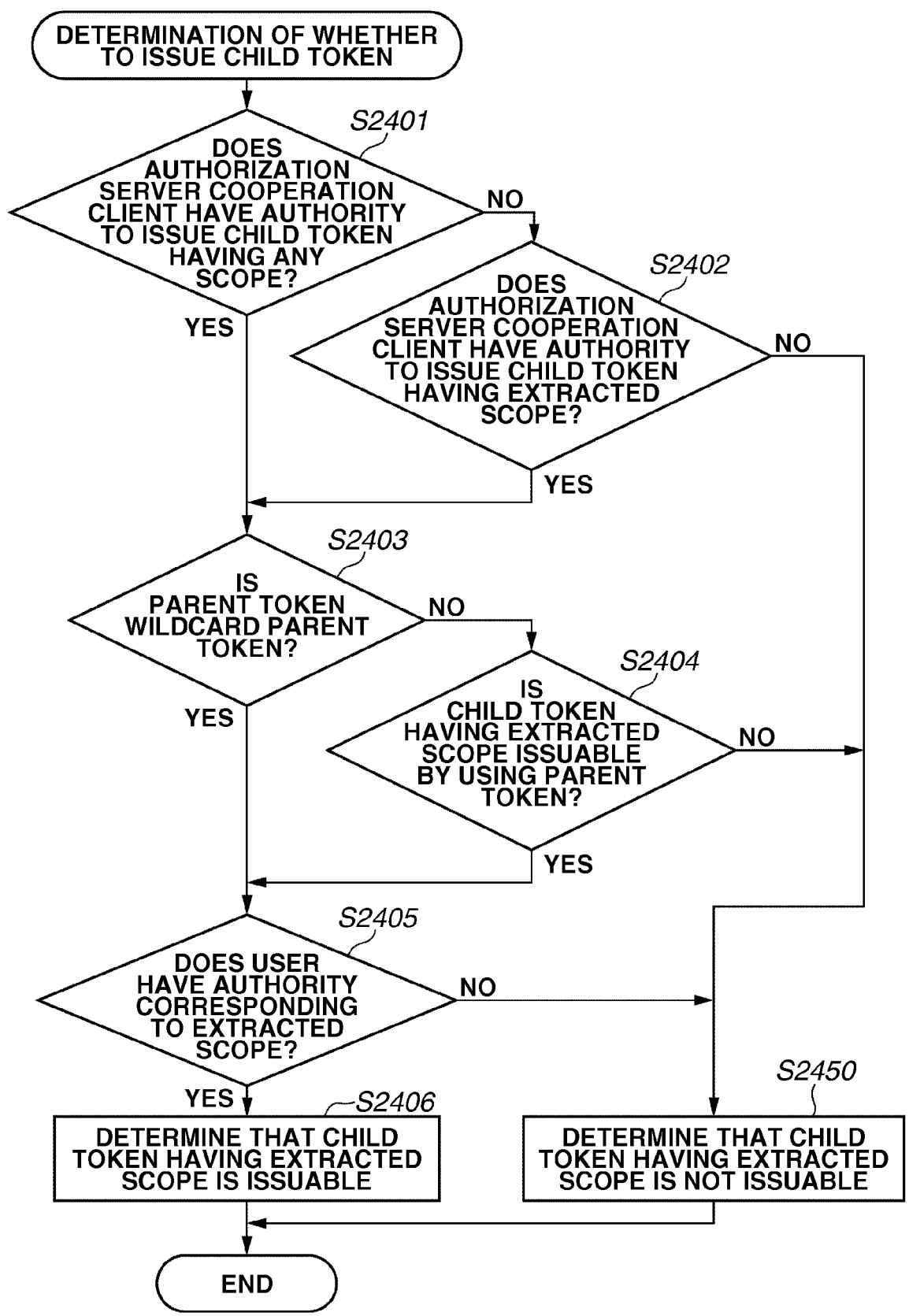

FIG. 6B illustrates a detailed flow for determining whether to issue a child token according to the present exemplary embodiment. This flow details step S2306 of FIG. 6A.

In step S2401, the child token issuing unit 611 determines whether the authorization server cooperation client 400 verified in step S2303 has the authorization to issue a child token having any scope. If the authorization server cooperation client 400 is determined to be authorized to issue a child token having any scope (YES in step S2401), the child token issuing unit 611 proceeds to step S2403. If not (NO in step S2401), the child token issuing unit 611 proceeds to step S2402.

The child token issuing unit 611 makes the determination by using the client authorization table 650 as illustrated in FIG. 10A. According to the client authorization table 650, client DEF has authorization any Scope to issue a child token having any scope. If the authorization server cooperation client 400 requesting the child token has the client ID of client DEF, the child token issuing unit 611 determines that the authorization server cooperation client 400 is authorized to issue the child token.

In step S2402, the child token issuing unit 611 determines whether the authorization server cooperation client 400 verified in step S2303 has the authorization to issue a child token having the scope extracted in step S2305. If the authorization server cooperation client 400 is determined to be authorized to issue the child token (YES in step S2402), the child token issuing unit 611 proceeds to step S2403. If the authorization server cooperation client 400 is determined not to be authorized to issue the child token (NO in step S2402), the child token issuing unit 611 proceeds to step S2450.

The child token issuing unit 611 makes the determination by using the client authorization table 650 as illustrated in FIG. 10A. According to the client authorization table 650, client ABC has the authorization to issue a child token having either one or both of the print scope and the createForm scope. If the client ID is clientABC and the requested scope is either one or both of the print scope and the createForm scope, the authorization server cooperation client 400 is determined to be authorized to issue the child token. If the requested scope includes a third scope, the issuance of a child token having only the print scope and the createForm scope may be allowed and the issuance of such a child token may be rejected.

In step S2403, the child token issuing unit 611 determines whether the parent token extracted in step S2305 is a wildcard parent token. If the extracted parent token is determined to be a wildcard parent token (YES in step S2403), the child token issuing unit 611 proceeds to step S2405. If the extracted parent token is determined not to be a wildcard parent token (NO in step S2403), the child token issuing unit 611 proceeds to step S2404. The child token issuing unit 611 makes the determination by using the issued parent token table 670 as illustrated in FIG. 11A. For example, if the parent token extracted in step S2305 is parentTokenWWXXYYZZ, the parent token is determined to be a wildcard parent token.

In step S2404, the child token issuing unit 611 determines whether the child token having the scope extracted in step S2305 is issuable by using the parent token extracted in step S2305. If the child token is determined to be issuable (YES in step S2404), the child token issuing unit 611 proceeds to step S2405. If the child token is determined not to be issuable (NO in step S2404), the child token issuing unit 611 proceeds to step S2450.

For example, if the parent token extracted in step S2305 is parentToken11335577, the parent token has the print scope and the createForm scope. In such a case, if the requested scope extracted in step S2305 is the print scope, the child token issuing unit 611 determines that the child token is issuable.

By the determination processing of steps S2403 and S2404, the authorization server 200 gives at least some of the authorization identified based on the parent token to the resource server cooperation application 500. The authorization server 200 then issues a child token for identifying the given authorization. In other words, the maximum authorization the authorization server 200 gives the resource server cooperation application 500 is limited to what falls within the authorization identified from the parent token and is needed for the resource server cooperation application 500.

In step S2405, the child token issuing unit 611 determines whether the user linked with the parent token has the authorization corresponding to the scope extracted in step S2305. The reason why the child token issuing unit 611 determines the authorization of the user again despite the issuance of the parent token is to deal with a wildcard parent token. A wildcard parent token is a token that can give any requested authorization to an application without limitation on authorization. With a wildcard parent token, there is a possibility that a child token might be issued even if the user does not have the authorization at the time of requesting the child token. The child token issuing unit 611 therefore determines the authorization of the user in step S2405.

If the child token is determined to be issuable (YES in step S2405), the child token issuing unit 611 proceeds to step S2406. If the child token is determined not to be issuable (NO in step S2405), the child token issuing unit 611 proceeds to step S2450. To make the determination, the child token issuing unit 611 determines the user linked with the parent token by using the issued parent token table 670, and further determines the authorization of the user by using the user authorization table 660.

For example, if the parent token extracted in step S2305 is parentToken11335577, the user linked with the parent token is cloudUserX. According to the user authorization table 660, cloudUserX is determined to have the authorization for the print scope and the authorization for the createForm scope. If the scope extracted in step S2305 is print, the child token issuing unit 611 determines that the child token is issuable.

In step S2406, the child token issuing unit 611 determines that the child token having the scope extracted in step S2305 is issuable, summarizing the determination results of steps S2401 to S2405. The child token issuing unit 611 ends the flow.

In step S2450, the child token issuing unit 611 determines that the child token having the scope extracted in step S2305 is not issuable. The child token issuing unit 611 ends the flow.

Up to this point, the processing by which the authorization server 200 issues a child token based on a parent token has been described in detail. As described above, the authorization server 200 determines not only the authorization of the parent token but also the authorization of the authorization server cooperation client 400 and that of the user. Processing by which the resource server cooperation application 500 uses a resource service by using a child token will now be described.

Figure 7A:
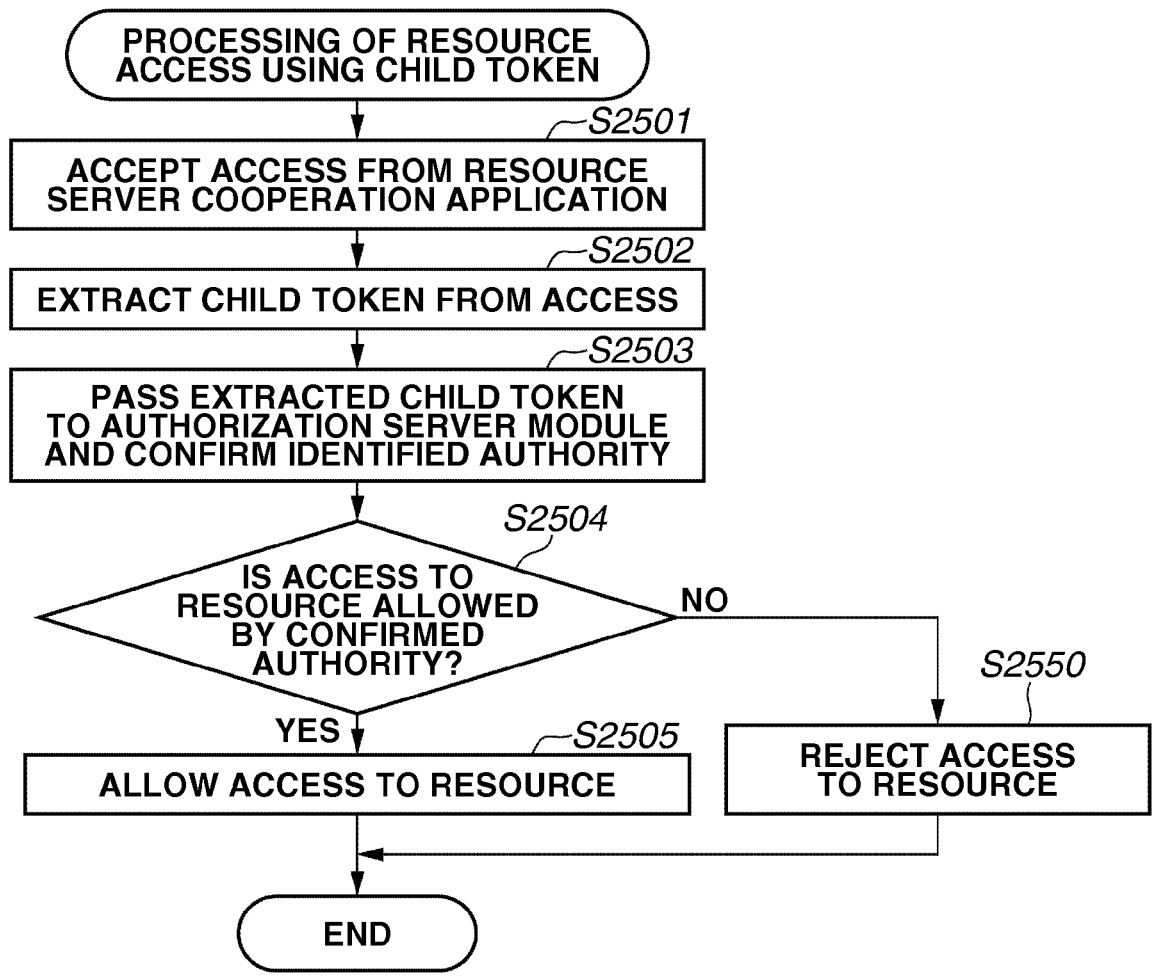
FIGS. 7A and 7B are flowcharts illustrating a processing flow to be performed by the resource server according to the exemplary embodiment of the present invention when resource access is made.

FIG. 7A illustrates a flow by which the resource server module 700 controls resource access using a child token according to the present exemplary embodiment. This flow starts when the resource server module 700 is accessed by the resource server cooperation application 500.

In step S2501, the resource server module 700 accepts access from the resource server cooperation application 500. In step S2502, the resource server module 700 extracts a child token from the access of the resource server cooperation application 500. In step S2503, the child token authorization confirmation unit 701 passes the child token extracted in step S2502 to the authorization server module 600 to confirm the authorization identified by the child token.

In step S2504, the child token authorization confirmation unit 701 receives information about the authorization that the authorization server 200 identified based on the child token in step S2503. The child token authorization confirmation unit 701 determines whether the access to the resource to which the access was accepted in step S2501 can be allowed by the authorization confirmed by the received information. If the child token authorization confirmation unit 701 determines that the access can be allowed (YES in step S2504), the child token authorization confirmation unit 701 proceeds to step S2505. If the access is determined to be rejected (NO in step S2504), the child token authorization confirmation unit 701 proceeds to step S2550.

For example, if the authorization confirmed in step S2503 is print and the authorization needed to access the resource to which the access was accepted in step S2501 is print, the child token authorization confirmation unit 701 determines that the access can be allowed.

In step S2505, the resource request processing unit 702 allows the access to the resource accepted in step S2501, and provides the service. In step S2550, the resource server module 700 rejects the access to the resource accepted in step S2501, and ends the flow.

Figure 7B:
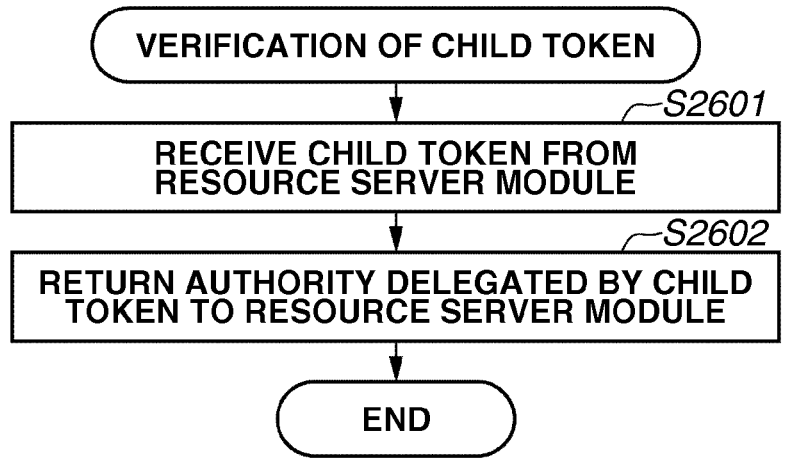

FIG. 7B illustrates a child token verification flow of the authorization server module 600 according to the present exemplary embodiment. This flow starts when the authorization server module 600 receives a child token. In step S2601, the child token verification unit 620 receives a child token from the resource server module 700.

In step S2602, the child token verification unit 620 determines the authorization delegated by the child token received in step S2601. The child token verification unit 620 returns the delegated authorization to the resource server module 700, and ends the flow.

For example, suppose that the received child token is childToken12345678. According to FIG. 11B, the child token verification unit 620 transmits the delegated authorization of print to the child token authorization confirmation unit 701 as the information about the identified authorization. So far the processing by which the resource server cooperation application 500 uses a resource service by using a child token has been described.

According to the first exemplary embodiment, authorization can be delegated between the three parties including the user, the apparatus, and the applications on the apparatus while reducing the number of user's authorization operations and preventing the delegation of excessive authorization to the applications on the apparatus.

The first exemplary embodiment of the present invention has been described on the assumption that a parent token needs to be issued. However, the authorization server cooperation client 400 may manage parent tokens user by user in advance. In such a case, the parent tokens become usable when the authorization server cooperation client 400 is installed in the image forming apparatus 300. This makes it difficult to deal with an increase in the number of users who use the image forming apparatus 300, whereas the processing for issuing a child token can be performed.

The first exemplary embodiment of the present invention has been described by using the image processing services including the form service and the printing service as an example of the resource services. However, this is not restrictive. The resource services may include other services such as a game application and a music contents distribution service. The first exemplary embodiment has also been described by using the image forming apparatus as an example of the apparatus or terminal. However, this is not restrictive. Other apparatuses such as a smartphone and a music device may be used. The first exemplary embodiment has dealt with the form application and the printing application as the resource service cooperation applications. However, this is not restrictive. The resource service cooperation applications may include other applications such as application management software and a music application. There is no limitation on the subjects that practice an exemplary embodiment of the present invention. While the resource services have been described on the assumption of being plural, only a single resource service may be provided.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, the delegation of excessive authorization to an application or applications can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-214267 filed Sep. 27, 2012, which is hereby incorporated by reference herein in its entirety.

What is claimed is:

1. An authorization server capable of communicating with a server configured to provide a resource service to an apparatus connected via a network and the apparatus including a resource service cooperation application configured to use the resource service, the authorization server comprising:

one or more processors; and one or more computer-readable media storing one or more programs, the one or more programs comprising instructions that, when executed by the one or more processors, cause the one or more processors to perform operations comprising:

receiving, at the authorization server from a browser on the apparatus, information associated with a client on the apparatus and a request for a token, the information and the request being transmitted by a user's operation via the browser;

issuing, by the authorization server, an authorization code in response to the request, transmitting to the browser the authorization code and a request for redirection to the client, and issuing first authorization information based on the authorization code received from the client which has requested the first authorization information, the client accepting the access of the browser redirected from the authorization server and receiving the authorization code from the browser at the time of the redirection, the first authorization information for identifying a first scope of authorization, the first scope of authorization including authorization to use the resource service, wherein the issuing the first authorization information is performed based on one or more user inputs indicating a user has authorized delegating authorization for using the resource service;

receiving, at the authorization server from the client, the first authorization information and a request to issue second authorization information corresponding to a second scope of authorization, the request to issue the second authorization information comprising a request sent by the client for delegating authorization for using the resource service by the resource service cooperation application;

in response to receiving the first authorization information and the request to issue the second authorization information, identifying:
the first scope of authorization based on the first authorization information, and
the second scope of authorization based on information specifying a requested scope of authorization for the second authorization information, determining whether to issue the second authorization information based on the first scope of authorization;

in response to determining to issue the second authorization information, issuing, by the authorization server, the second authorization information for identifying the second scope of authorization, wherein the second scope of authorization comprises a scope of authorization for using the resource service; and transmitting, from the authorization server to the client, the second authorization information, the second authorization information including information usable by the resource service cooperation application to access the resource services, wherein the determining whether to issue the second authorization information comprises determining whether the first scope of authorization encompasses the second scope of authorization, and wherein the issuing the second authorization information is performed in response to determining that the first scope of authorization encompasses the second scope of authorization.

2. The authorization server according to claim 1, the operations further comprising:
providing, to the apparatus, an authorization screen for presentation in the browser, the authorization screen prompting a user of the browser to provide an authorization operation, wherein the providing the authorization screen to the browser is performed based on the request for the token; and
receiving, at the authorization server from the browser on the apparatus, information indicating the user provided the authorization operation by using the authorization screen, the authorization operation comprising the one or more user inputs indicating the user has authorized delegating authorization for using the resource service,
wherein the issuing the first authorization information comprises issuing the first authorization information based on the authorization operation.

3. The authorization server according to claim 1, wherein the authorization server is configured to be capable for issuing the first authorization information for limiting the authorization to be used by the resource service cooperation application and the authorization server is configured to be capable for issuing the first authorization information for not limiting the authorization to be used by the resource service cooperation application,
wherein the determining whether to issue the second authorization information comprises determining whether the first authorization information is not limiting the authorization to be used by the resource service cooperation application, and
wherein, in response to determining that the first authorization information is not limiting the authorization to be used by the resource service cooperation application, the issuing the second authorization information is performed without comparing the first scope of authorization to the second scope of authorization.

4. The authorization server according to claim 1, wherein the determining whether to issue the second authorization information comprises:
identifying the user based on the first authorization information;
identifying authority of the user based on information indicating a scope of authorization associated with the user; and
determining whether the authority of the user includes authorization corresponding to the second scope of authorization,
wherein the issuing the second authorization information is performed in response to determining that the authority of the user includes authorization corresponding to the second scope of authorization.

5. The authorization server according to claim 1, wherein the determining whether to issue the second authorization information comprises determining whether authority of the client includes authorization corresponding to the second scope of authorization, and wherein the issuing the second authorization information is performed in response to determining that the authority of the client includes authorization corresponding to the second scope of authorization.

6. The authorization server according to claim 1, the operations further comprising:
receiving, at the authorization server from the server, the second authorization information;
identifying the second scope of authorization based on the second authorization information, the second scope of authorization comprising authorization for using the resource service; and
transmitting, from the authorization server to the server, information about the second scope of authorization,
wherein the information about the second scope of authorization includes information usable by the server to confirm that the authorization corresponding to the second authorization information is the authorization for using the resource service, and to authorize the resource service cooperation application using the resource service by the confirmed authorization.

7. The authorization server according to claim 1, wherein the apparatus is an image forming apparatus comprising at least one of image processing units including a printing unit and a scanner unit,
wherein the server comprises at least one of image processing services including a printing service and a form service, and
wherein the authorization server is configured to be capable for communicating with the apparatus and the server.

8. The authorization server according to claim 1, wherein the apparatus is a smartphone, and
wherein the authorization server is connectable with the smartphone.

9. A control method for controlling an authorization server connectable with a server configured to provide a resource service to an apparatus connected via a network and the apparatus including a resource service cooperation application configured to use the resource service, the method comprising:
receiving, at the authorization server from a browser on the apparatus, information associated with a client on the apparatus and a request for a token, the information and the request being transmitted by a user's operation via the browser;

issuing, by the authorization server, an authorization code in response to the request, transmitting to the browser the authorization code and a request for redirection to the client, and issuing first authorization information based on the authorization code received from the client which has requested the first authorization information, the client accepting the access of the browser redirected from the authorization server and receiving the authorization code from the browser at the time of the redirection, the first authorization information for identifying a first scope of authorization, the first scope of authorization including authorization to use the resource service, wherein the issuing the first authorization information is performed based on one or more user inputs indicating a user has authorized delegating authorization for using the resource service;

receiving, at the authorization server from the client, the first authorization information and a request to issue second authorization information corresponding to a second scope of authorization, the request to issue the second authorization information comprising a request sent by the client for delegating authorization for using the resource service by the resource service cooperation application;

in response to receiving the first authorization information and the request to issue the second authorization information, identifying:
  the first scope of authorization based on the first authorization information, and
  the second scope of authorization based on information specifying a requested scope of authorization for the second authorization information, determining whether to issue the second authorization information based on the first scope of authorization;

in response to determining to issue the second authorization information, issuing, by the authorization server, the second authorization information for identifying the second scope of authorization, wherein the second scope of authorization comprises a scope of authorization for using the resource service; and transmitting, from the authorization server to the client, the second authorization information, the second authorization information including information usable by the resource service cooperation application to access the resource services, wherein the determining whether to issue the second authorization information comprises determining whether the first scope of authorization encompasses the second scope of authorization, and wherein the issuing the second authorization information is performed in response to determining that the first scope of authorization encompasses the second scope of authorization.

10. A non-transitory storage medium storing a program that, when executed! by n authorization server, causes the authorization server to perform method for controlling an authorization server connectable with a server configured to provide a resource service to an apparatus connected via a network and the apparatus including a resource service cooperation application configured to use the resource service, the method comprising:

receiving, at the authorization server from a browser on the apparatus, information associated with a client on the apparatus and a request for a token, the information and the request being transmitted by a user's operation via the browser;

issuing, by the authorization server, an authorization code in response to the request, transmitting to the browser the authorization code and a request for redirection to the client, and issuing first authorization information based on the authorization code received from the client which has requested the first authorization information, the client accepting the access of the browser redirected from the authorization server and receiving the authorization code from the browser at the time of the redirection, the first authorization information for identifying a first scope of authorization, the first scope of authorization including authorization to use the resource service, wherein the issuing the first authorization information is performed based on one or more user inputs indicating a user has authorized delegating authorization for using the resource service;

receiving, at the authorization server from the client, the first authorization information and a request to issue second authorization information corresponding to a second scope of authorization, the request to issue the second authorization information comprising a request sent by the client for delegating authorization for using the resource service by the resource service cooperation application;

in response to receiving the first authorization information and the request to issue the second authorization information, identifying:
  the first scope of authorization based on the first authorization information, and
  the second scope of authorization based on information specifying a requested scope of authorization for the second authorization information, determining whether to issue the second authorization information based on the first scope of authorization;

in response to determining to issue the second authorization information, issuing, by the authorization server, the second authorization information for identifying the second scope of authorization, wherein the second scope of authorization comprises a scope of authorization for using the resource service; and transmitting, from the authorization server to the client, the second authorization information, the second authorization information including information usable by the resource service cooperation application to access the resource services, wherein the determining whether to issue the second authorization information comprises determining whether the first scope of authorization encompasses the second scope of authorization, and wherein the issuing the second authorization information is performed in response to determining that the first scope of authorization encompasses the second scope of authorization.

11. An authorization system including, an apparatus which has a resource service cooperation application configured to use a resource service, and an authorization server capable of communicating with a server configured to provide the resource service to the apparatus connected via a network, the authorization system comprising:

one or more processors; and one or more computer-readable media storing one or more programs, the one or more programs comprising instructions that, when executed by the one or more processors, cause the one or more processors to perform operations comprising:

sending, from a browser on the apparatus, information associated with a client on the apparatus and a request for a token;

receiving, at the authorization server from a browser on the apparatus, the information and the request, the information and the request being transmitted by a user's operation via the browser;

issuing, by the authorization server, an authorization code in response to the request, transmitting to the browser the authorization code and a request for redirection to the client, and issuing first authorization information based on the authorization code received from the client which has requested the first authorization information, the client accepting the access of the browser redirected from the authorization server and receiving the authorization code from the browser at the time of the redirection, the first authorization information for identifying a first scope of authorization, the first scope of authorization including authorization to use the resource service, wherein the issuing the first authorization information is performed based on one or more user inputs indicating a user has authorized delegating authorization for using the resource service;

receiving, at the authorization server from the client, the first authorization information and a request to issue second authorization information corresponding to a second scope of authorization, the request to issue the second authorization information comprising a request sent by the client for delegating authorization for using the resource service by the resource service cooperation application;

in response to receiving the first authorization information and the request to issue the second authorization information, identifying:
  the first scope of authorization based on the first authorization information, and
  the second scope of authorization based on information specifying a requested scope of authorization for the second authorization information;

determining whether to issue the second authorization information based on the first scope of authorization;

in response to determining to issue the second authorization information, issuing, by the authorization server, the second authorization information for identifying the second scope of authorization, wherein the second scope of authorization comprises a scope of authorization for using the resource service; and transmitting, from the authorization server to the client, the second authorization information, the second authorization information including information usable by the resource service cooperation application to access the resource service, wherein the determining whether to issue the second authorization information comprises determining whether the first scope of authorization encompasses the second scope of authorization, and wherein the issuing the second authorization information is performed in response to determining that the first scope of authorization encompasses the second scope of authorization.

* * * * *